United States Patent
Lee et al.

(10) Patent No.: US 11,004,408 B2
(45) Date of Patent: May 11, 2021

(54) LIQUID CRYSTAL DISPLAY DEVICE

(71) Applicant: LG ELECTRONICS INC., Seoul (KR)

(72) Inventors: Myongyoung Lee, Seoul (KR); Jongmin Lee, Seoul (KR); Taeha Um, Seoul (KR); Yeonoh Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/714,510

(22) Filed: Dec. 13, 2019

(65) Prior Publication Data

US 2020/0320940 A1    Oct. 8, 2020

(30) Foreign Application Priority Data

Apr. 8, 2019    (KR) .................. 10-2019-0041089

(51) Int. Cl.
*G09G 3/34* (2006.01)
*G02F 1/1335* (2006.01)
*G02F 1/13357* (2006.01)

(52) U.S. Cl.
CPC ..... *G09G 3/3426* (2013.01); *G02F 1/133602* (2013.01); *G09G 2320/0646* (2013.01)

(58) Field of Classification Search
CPC combination set(s) only.
See application file for complete search history.

(56) References Cited

U.S. PATENT DOCUMENTS

| | | | |
|---|---|---|---|
| 2010/0265262 A1 | 10/2010 | Choe et al. | |
| 2011/0128302 A1 | 6/2011 | Cho et al. | |
| 2011/0148941 A1* | 6/2011 | Kim | .......... G09G 3/3426 345/690 |
| 2015/0055025 A1 | 2/2015 | Gotoh | |
| 2019/0089924 A1 | 3/2019 | Woo et al. | |

FOREIGN PATENT DOCUMENTS

| | | |
|---|---|---|
| JP | 2013182268 | 9/2013 |
| KR | 101295882 | 8/2013 |
| KR | 101612455 | 4/2016 |

OTHER PUBLICATIONS

PCT International Application No. PCT/KR2014/005057, International Search Report dated Nov. 23, 3 pages.

* cited by examiner

*Primary Examiner* — Deeprose Subedi
(74) *Attorney, Agent, or Firm* — Lee, Hong, Degerman, Kang & Waimey PC

(57) ABSTRACT

The present invention relates to a liquid crystal display device that provides improved local dimming. The liquid crystal display device includes: a liquid crystal display panel; a backlight unit divided and driven into a plurality of blocks and supplying light to the liquid crystal display panel; a local dimming value calculator calculating a dimming value of each of the blocks in accordance with input image data; and a backlight dimming controller having a pixel corrector correcting image data on the basis of the dimming values, in which the backlight dimming controller can correct at least some of the dimming values of the blocks calculated by the local dimming value calculator.

20 Claims, 18 Drawing Sheets

(a)

(b)

(a) AVERAGE BRIGHTNESS ⇒ OUTPUT BRIGHTNESS (b) AVERAGE BRIGHTNESS ⇒ OUTPUT BRIGHTNESS

LIQUID CRYSTAL DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. 10-2019-0041089, filed on Apr. 8, 2019, the contents of which are hereby incorporated by reference herein in its entirety.

BACKGROUND

The present invention relates to a Liquid crystal display device.

An active matrix liquid crystal display device displays moving images using a thin film transistor (hereafter, referred to as a "TFT") that is a switching element. A liquid crystal display device can be manufactured in a small size, as compared with a Cathode Ray Tube (CRT), so it is used for not only a portable information device, an office device, and a display device such as a computer, but also a television. Accordingly, the liquid crystal display device has rapidly replaced the CRT.

A transmissive liquid crystal display device that occupies most of liquid crystal display devices displays an image by modulating light from a backlight unit by controlling an electric field that is applied to a liquid crystal layer. The image quality of a liquid crystal display device depends on a contrast characteristic. Backlight dimming that adjusts the brightness of light sources of a backlight unit in accordance with images has been proposed to improve the contrast characteristic.

Local dimming that is one of the backlight dimming can improve static contrast by partially controlling the luminance of a display surface within one frame period.

The local dimming of the related art separates input digital image data in accordance with virtual blocks separated in a matrix shape on a display surface of a liquid crystal display panel, derives a representative value of the input digital data for each block, and controls the brightness of the light sources of a backlight unit for each block by adjusting a dimming value for each block in accordance with the representative value for each block.

Meanwhile, contrast is more improved when local dimming is performed on an image with many low-frequency components than when local dimming is not performed. However, contrast is less improved when local dimming is performed on an image with many high-frequency components than when local dimming is not performed.

SUMMARY

The present invention provides a liquid crystal display device that performs improved local dimming.

In detail, the present invention relates to a liquid crystal display device that performs improved local dimming that improves contrast of high-frequency components of an image, and a method of driving the liquid crystal display device.

A liquid crystal display device according to an embodiment of the present invention includes: a liquid crystal display panel; a backlight unit divided and driven into a plurality of blocks and supplying light to the liquid crystal display panel; and a backlight dimming controller comprising a local dimming value calculator calculating a dimming value of each of the blocks in accordance with input image data, and a backlight dimming controller having a pixel corrector correcting image data on the basis of the dimming values, in which the backlight dimming controller can correct at least some of the dimming values of the blocks calculated by the local dimming value calculator.

The backlight dimming controller may further include a correction dimming value calculator that corrects at least some of the dimming values of the blocks on the basis of an image according to the input image data and an image according to image data corrected in accordance with the dimming values calculated by the local dimming value calculator.

The correction dimming value calculator may correct a dimming value to be larger than a maximum dimming value when the local dimming value calculator calculates a dimming value.

When average brightness and maximum brightness of a first block and a second block are the same and the second block has more high-frequency components than the first block, the local dimming value calculator may calculate the dimming value of the first block and the dimming value of the second block to be the same.

The correction dimming value calculator may correct the dimming value of the second block to be larger than the dimming value of the first block.

The pixel corrector may correct the input image data on the basis of the corrected dimming value of each of the blocks.

The backlight dimming controller may further include a correction block acquirer that acquires a data loss block on the basis of the difference between a first image according to the input image data and a second image according to the dimming value of each of the blocks calculated by the local dimming value calculator.

The correction block acquirer may acquire the data loss block on the basis of at least one of a Structural Similarity Index (SSIM), a Peak Signal-to-Noise Ratio (PSNR), or a Mean Square Error (MSE) of the first image and the second image.

The correction block acquirer may calculate the SSIM and acquire a block of which the SSIM is less than a predetermined reference value as the data loss block.

The liquid crystal display device may further include an image analyzer extracting a high-frequency component on the basis of the input image data, in which the backlight dimming controller may correct at least some of the dimming values of the blocks on the basis of the high-frequency component extracted by the image analyzer.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE EMBODIMENTS

Hereinafter, the present invention will be described in detail with reference to the drawings.

The suffixes "module" and "unit" for components used in the description below are assigned or mixed in consideration of easiness in writing the specification and do not have distinctive meanings or roles by themselves.

It will be understood that, although the terms first, second, etc. may be used herein to describe various elements of the present invention, these terms are only used to distinguish one element from another element and essential, order, or sequence of corresponding elements are not limited by these terms.

A singular representation may include a plural representation unless context clearly indicates otherwise.

It will be understood that the terms "comprise", "include", etc., when used in this specification, specify the presence of several components or several steps and part of the components or steps may not be included or additional components or steps may further be included.

Figure 1:
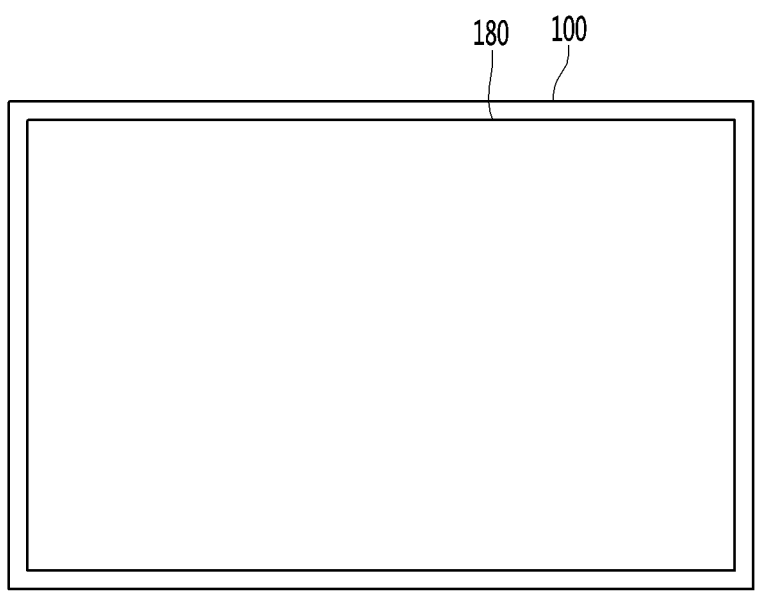
FIG. 1 is a diagram illustrating a display device according to an embodiment of the present invention.

FIG. 1 is a diagram illustrating a display device according to an embodiment of the present invention.

With reference to the drawings, a display device 100 includes a display 180.

On the other hand, the display 180 is realized by one among various panels. For example, the display 180 is one of the following panels: a liquid crystal display panel (LCD panel), an organic light-emitting diode (OLED) panel (OLED panel), and an inorganic light-emitting diode (ILED) panel (ILED panel).

According to the present invention, the display 180 is assumed to include a liquid crystal display panel (LCD panel).

On the other hand, examples of the display device 100 in FIG. 1 include a monitor, a TV, a tablet PC, a mobile terminal, and so on.

Figure 2:
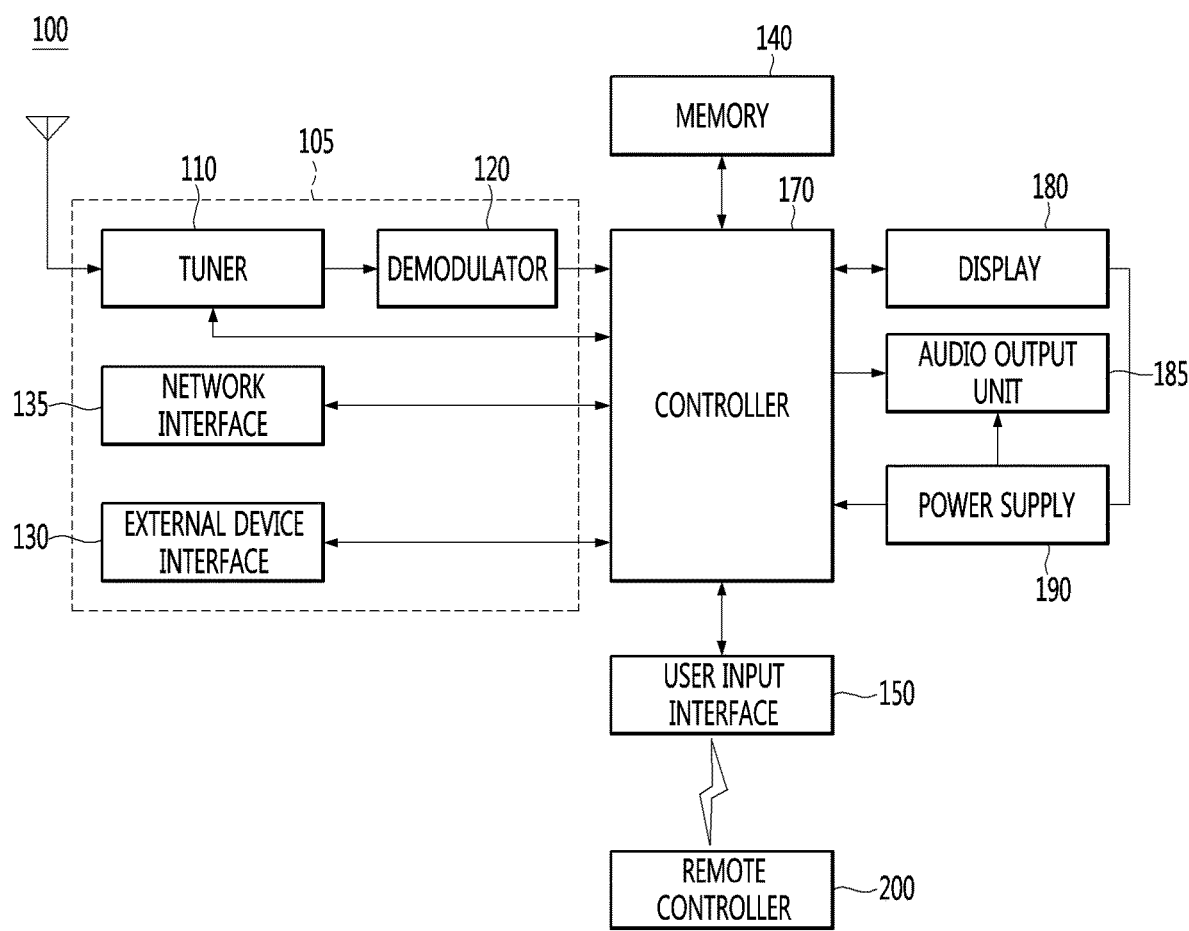
FIG. 2 is an example of a block diagram of the inside of the display device in FIG. 1.

FIG. 2 is an example of a block diagram of the inside of the display device in FIG. 1.

With reference to FIG. 2, the display device 100 according to an embodiment of the present invention includes a broadcast reception unit 105, an external device interface 130, a memory 140, a user input interface 150, a sensor unit (not illustrated), a controller 170, a display 180, an audio output unit 185, and a power supply unit 190.

The broadcast reception unit 105 includes a tuner unit 110, a demodulator 120, a network interface 135, and an external device interface 130.

On the other hand, unlike in the drawings, it is also possible that the broadcast reception unit 105 only includes the tuner unit 110, the demodulator 120, and the external device interface 130. That is, the network interface 135 may not be included.

The tuner unit 110 selects a radio frequency (RF) broadcast signal that corresponds to a channel which is selected by a user, or RF broadcast signals that correspond to all channels that are already stored, among RF broadcast signals that are received through an antenna (not illustrated). In addition, the selected RF broadcast signal is converted into an intermediate frequency signal, a baseband image, or an audio signal.

For example, the selected RF broadcast signal, if is a digital broadcast signal, is converted into a digital IF (DIF) signal, and, if is an analog broadcast signal, is converted into an analog baseband image or an audio signal (CVBS/SIF). That is, the tuner unit 110 processes a digital broadcast signal or an analog broadcast signal. The analog baseband image or the audio signal (CVBS/SIF) output from the tuner unit 110 is input directly into the controller 170.

On the other hand, the tuner unit 110 possibly includes a plurality of tuners in order to receive broadcast signals in a plurality of channels. In addition, it is also possible that a signal tuner that receives the broadcast signals in the plurality of channels at the same time is included.

The demodulator 120 receives a digital IF (DIF) signal that results from the conversion in the tuner unit 110 and performs a demodulation operation on the received digital IF signal.

The demodulator 120 performs demodulation and channel decoding, and then outputs a stream signal (TS). At this time, the stream signal is a signal that results from multiplexing image signals, audio signals, or data signals.

The stream signal output from the demodulator 120 is input into the controller 170. The controller 170 performs demultiplexing, video and audio signal processing, and so on, and then outputs the resulting image to the display 180 and outputs the resulting audio to the audio output unit 185.

The external device interface 130 transmits or receives data to and from an external apparatus (not illustrated)

connected, for example, a set-top box. To do this, the external device interface 130 includes an A/V input and output unit (not illustrated).

The external device interface 130 is connected in a wired or wireless manner to an external apparatus, such as a digital versatile disc (DVD), a Blu-ray disc, a game device, a camera, a camcorder, a computer (a notebook computer), or a set-top box, and may perform inputting and outputting operations for reception and transmission of data to and from the external apparatus.

An image and an audio signal of the external apparatus are input into the A/V input and output unit. On the other hand, a wireless communication unit (not illustrated) performs a short-distance wireless communication with a different electronic apparatus.

Through the wireless communication unit (not illustrated), the external device interface 130 transmits and receives data to and from the nearby mobile terminal (not illustrated). Particularly, in a mirroring mode, the external device interface 130 receives device information, information on an application executed, an application image, and so on from the mobile terminal 600.

The network interface 135 provides an interface for connecting the display device 100 to wired and wireless networks including the Internet. For example, the network interface 135 receives items of content or pieces of data pieces that are provided by a content provider or a network operator through a network or the Internet.

On the other hand, the network interface 135 includes the wireless communication unit (not illustrated).

A program for controlling processing or control of each signal within the controller 170 may be stored in the memory 140. An image signal, an audio signal, or a data signal, which results from signal processing, may be stored in the memory 140.

In addition, an image signal, an audio signal, or a data signal, which is input into the external device interface 130, may be temporarily stored in the memory 140. In addition, information on a predetermined broadcast channel may be stored in the memory 140 through a channel storage function such as a channel map.

An embodiment in which the memory 140 is provided separately from the controller 170 is illustrated in FIG. 2, but the scope of the present invention is not limited to this. The memory 140 is included within the controller 170.

The user input interface 150 transfers a signal input by the user, to the controller 170, or transfers a signal from the controller 170 to the user.

For example, user input signals, such as power-on and-off signals, a channel selection signal, and a screen setting signal, are transmitted and received to and from a remote controller 200, user input signals that are input from local keys (not illustrated), such as a power key, a channel key, a volume key, and a setting key, are transferred to the controller 170, a user input signal input from the sensing unit (not illustrated) that senses a user's gesture is transferred to the controller 170, or a signal from the controller 170 is transmitted to the sensing unit (not illustrated).

The controller 170 demultiplexes a stream input through the tuner unit 110, the demodulator 120, the network interface 135, the external device interface 130, or processes signals that results from demultiplexing, and thus generates and outputs a signal for outputting an image and audio.

An image signal that results from image-processing in the controller 170 is input into the display 180, and an image that corresponds to the image signal is displayed. In addition, the image signal that results from the image-processing in the controller 170 is input into an external output apparatus through the external device interface 130.

An audio signal that results from processing in the controller 170 is output, as audio, to the audio output unit 185. In addition, an audio signal that results from processing in the controller 170 is input into an external output apparatus through the external device interface 130.

Although not illustrated in FIG. 2, the controller 170 includes a demultiplexer, an image processing unit, and so on. The details of this will be described below with reference to FIG. 3.

In addition, the controller 170 controls an overall operation within the display device 100. For example, the controller 170 controls the tuner unit 110 in such a manner that the tuner unit 110 performs selection of (tuning to) a RF broadcast that corresponds to a channel selected by the user or a channel already stored.

In addition, the controller 170 controls the display device 100 using a user command input through the user input interface 150, or an internal program.

On the other hand, the controller 170 controls the display 180 in such a manner that an image is displayed. At this time, the image displayed on the display 180 is a still image, or a moving image, and is a 2D image or a 3D image.

On the other hand, the controller 170 is configured to a predetermined object is displayed within the image displayed on the display 180. For example, the object is at least one of the following: a web screen (a newspaper, a magazine, or so on) connected, an electronic program guide (EPG), various menus, a widget, an icon, a still image, a moving image, and text.

On the other hand, the controller 170 recognizes a location of the user, based on an image captured by an imaging unit (not illustrated). For example, a distance (a z-axis coordinate) between the user and the display device 100 is measured. In addition, a x-axis coordinate and a y-axis coordinate within the display 180, which correspond to the location of the user are calculated.

The display 180 converts an image signal, a data signal, an OSD signal, a control signal that result from the processing in the controller 170, or an image signal, a data signal, a control signal, and so on that are received in the external device interface 130, and generates a drive signal.

On the other hand, the display 180 is configured with a touch screen, and thus is also possibly used as an input device, in addition to an output device.

The audio output unit 185 receives a signal that results from audio processing the controller 170, as an input, and outputs the signal, as audio.

The imaging unit (not illustrated) captures an image of the user. The imaging unit (not illustrated) is realized as one camera, but is not limited to the one camera. It is also possible that the image unit is realized as a plurality of cameras. Information of an image captured by the imaging unit (not illustrated) is input into the controller 170.

Based on the image captured by the imaging unit (not illustrated), or on an individual signal detected by the sensing unit (not illustrated) or a combination of the detected individual signals, the controller 170 detects the user's gesture.

A power supply unit 190 supplies required powers to the entire display device 100. Particularly, a power is supplied to the controller 170 realized in the form of a system-on-chip (SOC), the display 180 for image display, the audio output unit 185 for audio output, and so on.

Specifically, the power supply unit 190 includes a converter that converts an alternating current power into a direct current power, and a dc/dc converter that converts a level of the direct current power.

The remote controller 200 transmits a user input to the user input interface 150. To do this, the remote controller 200 employs Bluetooth, radio frequency (RF) communication, infrared (IR) communication, ultra-wideband (UWB), a ZigBee specification, and so on. In addition, the remote controller 200 receives an image signal, an audio signal, or a data signal output from the user input interface 150, and displays the received signal on a display unit of the remote controller 200 or outputs the received signal, as audio, to an output unit of the remote controller 200.

On the other hand, the display device 100 described above is a digital broadcast receiver that possibly receives a fixed-type or mobile-type digital broadcast.

On the other hand, a block diagram of the display device 100 illustrated in FIG. 2 is a block diagram for an embodiment of the present invention. Each constituent element in the block diagram is subject to integration, addition, or omission according to specifications of the display device 100 actually realized. That is, two or more constituent elements are to be integrated into one constituent element, or one constituent element is to be divided into two or more constituent elements. In addition, a function performed in each block is for description of an embodiment of the present invention, and specific operation of each constituent element imposes no limitation to the scope of the present invention.

Figure 3:
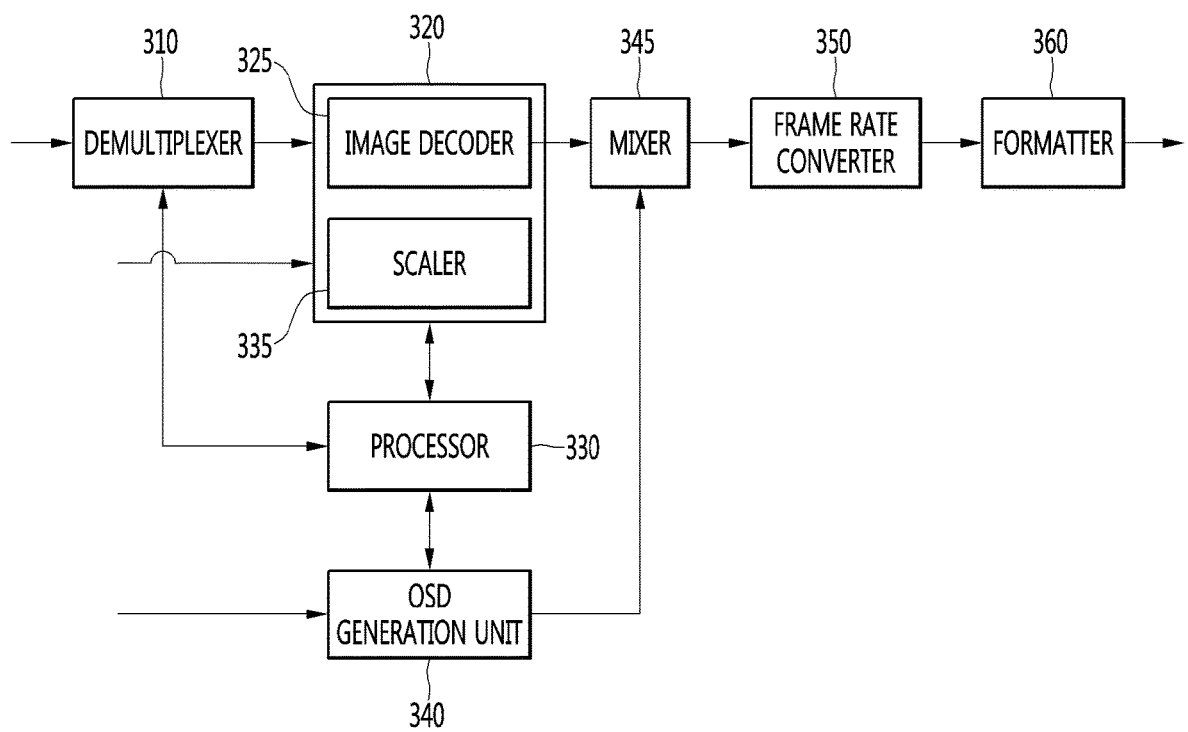
FIG. 3 is an example of a block diagram of the inside of a controller in FIG. 2.

FIG. 3 is an example of a block diagram of the inside of a controller in FIG. 2.

For description with reference to the drawings, the controller 170 according to an embodiment of the present invention includes a demultiplexer 310, an image processing unit 320, a processor 330, an OSD generation unit 340, a mixer 345, a frame rate converter 350, and a formatter 360. In addition, an audio processing unit (not illustrated) and a data processing unit (not illustrated) are further included.

The demultiplexer 310 demultiplexes a stream input. For example, in a case where an MPEG-2 TS is input, the MPEG-2 TS is demultiplexed into an image signal, an audio signal, and a data signal. At this point, a stream signal input into the demultiplexer 310 is a stream signal output from the tuner unit 110, the demodulator 120, or the external device interface 130.

The image processing unit 320 performs image processing of the image signal that results from the demultiplexing. To do this, the image processing unit 320 includes an image decoder 325 or a scaler 335.

The image decoder 325 decodes the image signal that results from the demultiplexing. The scaler 335 performs scaling in such a manner that a resolution of an image signal which results from the decoding is such that the image signal is possibly output to the display 180.

Examples of the image decoder 325 possibly include decoders in compliance with various specifications. For example, the examples of the image decoder 325 include a decoder for MPEG-2, a decoder for H.264, a 3D image decoder for a color image and a depth image, a decoder for a multi-point image, and so on.

The processor 330 controls an overall operation within the display device 100 or within the controller 170. For example, the processor 330 controls the tuner unit 110 in such a manner that the tuner unit 110 performs the selection of (tuning to) the RF broadcast that corresponds to the channel selected by the user or the channel already stored.

In addition, the processor 330 controls the display device 100 using the user command input through the user input interface 150, or the internal program.

In addition, the processor 330 performs control of transfer of data to and from the network interface 135 or the external device interface 130.

In addition, the processor 330 controls operation of each of the demultiplexer 310, the image processing unit 320, the OSD generation unit 340, and so on within the controller 170.

The OSD generation unit 340 generates an OSD signal, according to the user input or by itself. For example, based on the user input signal, a signal is generated for displaying various pieces of information in a graphic or text format on a screen of the display 180. The OSD signal generated includes various pieces of data for a user interface screen of the display device 100, various menu screens, a widget, an icon, and so on. In addition, the OSD generated signal includes a 2D object or a 3D object.

In addition, based on a pointing signal input from the remote controller 200, the OSD generation unit 340 generates a pointer possibly displayed on the display. Particularly, the pointer is generated in a pointing signal processing unit, and an OSD generation unit 340 includes the pointing signal processing unit (not illustrated). Of course, it is also possible that instead of being providing within the OSD generation unit 340, the pointing signal processing unit (not illustrated) is provided separately.

The mixer 345 mixes the OSD signal generated in the OSD generation unit 340, and the image signal that results from the image processing and the decoding in the image processing unit 320. An image signal that results from the mixing is provided to the frame rate converter 350.

The frame rate converter (FRC) 350 converts a frame rate of an image input. On the other hand, it is also possible that the frame rate converter 350 outputs the image, as is, without separately converting the frame rate thereof.

On the other hand, the formatter 360 converts a format of the image signal input, into a format for an image signal to be displayed on the display, and outputs an image that results from the conversion of the format thereof.

The formatter 360 changes the format of the image signal. For example, a format of a 3D image signal is changed to any one of the following various 3D formats: a side-by-side format, a top and down format, a frame sequential format, an interlaced format, and a checker box format.

On the other hand, the audio processing unit (not illustrated) within the controller 170 performs audio processing of an audio signal that results from the demultiplexing. To do this, the audio processing unit (not illustrated) includes various decoders.

In addition, the audio processing unit (not illustrated) within the controller 170 performs processing for base, treble, volume adjustment and so on.

The data processing unit (not illustrated) within the controller 170 performs data processing of a data signal that results from the demultiplexing. For example, in a case where a data signal that results from the demultiplexing is a data signal the results from coding, the data signal is decoded. The data signal that results from the coding is an electronic program guide that includes pieces of broadcast information, such as a starting time and an ending time for a broadcast program that will be telecast in each channel.

On the other hand, a block diagram of the controller 170 illustrated in FIG. 3 is a block diagram for an embodiment of the present invention. Each constituent element in the block diagram is subject to integration, addition, or omission according to specifications of the image display controller 170 actually realized.

Particularly, the frame rate converter 350 and the formatter 360 may be provided separately independently of each other or may be separately provided as one module, without being provided within the controller 170.

Figure 4A:
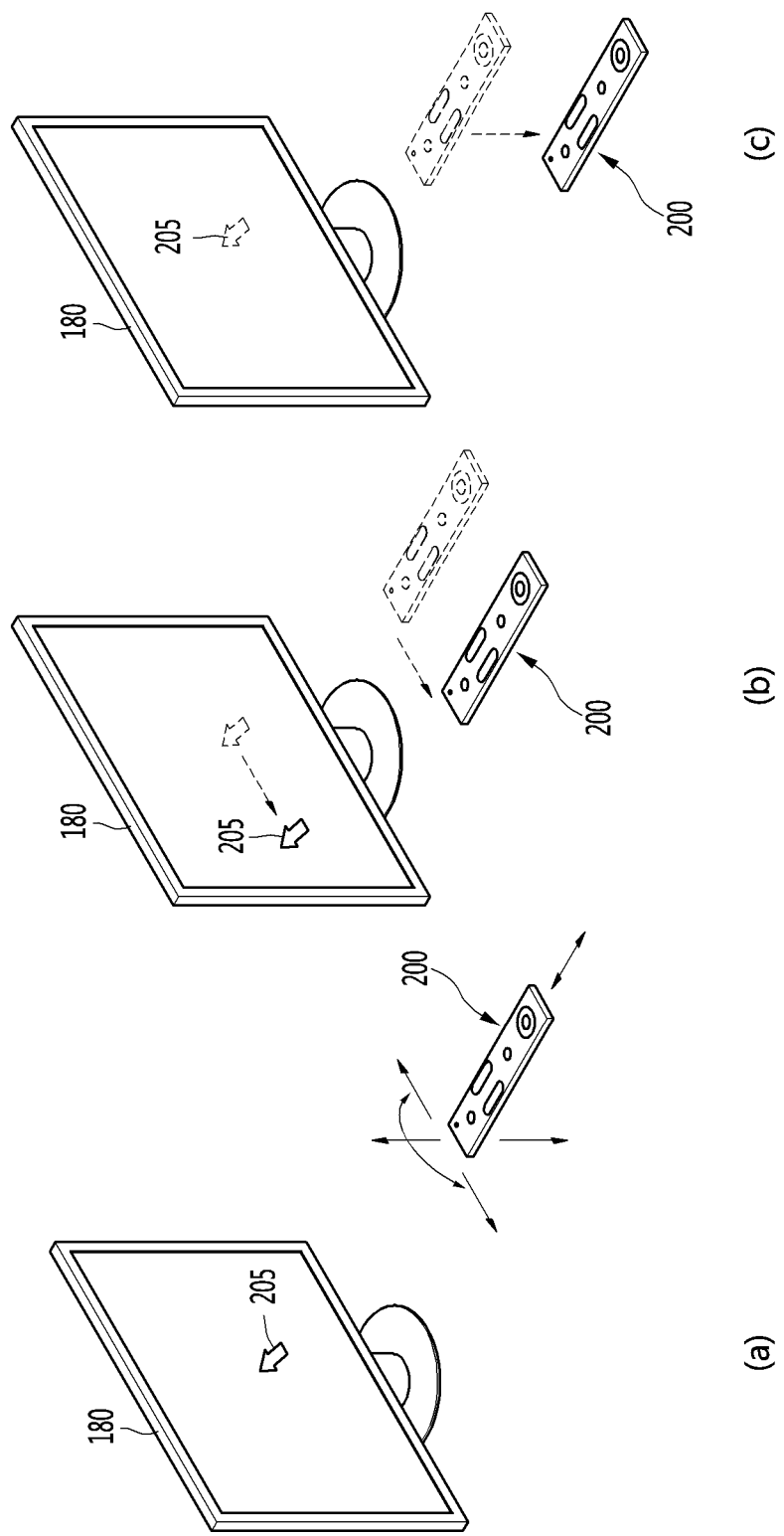
FIG. 4A is a diagram illustrating a method in which the remote controller in FIG. 2 performs control.

FIG. 4A is a diagram illustrating a method in which the remote controller in FIG. 2 performs control.

In FIG. 4A(a), it is illustrated that a pointer 205 which corresponds to the remote controller 200 is displayed on the display 180.

The user moves or rotates the remote controller 200 upward and downward, leftward and rightward (FIG. 4A(b)), and forward and backward (FIG. 4A(c)). The pointer 205 displayed on the display 180 of the display device corresponds to movement of the remote controller 200. As in the drawings, movement of the pointer 205, which depends on the movement of the remote controller 200 in a 3D space, is displayed and thus, the remote controller 200 is named a spatial remote controller or a 3D pointing device.

FIG. 4A(b) illustrates that, when the user moves the remote controller 200 leftward, the pointer 205 displayed on the display 180 of the display device correspondingly moves leftward.

Information on the movement of the remote controller 200, which is detected through a sensor of the remote controller 200, is transferred to the display device. The display device calculates the information on the movement of the remote controller 200 from coordinates of the pointer 205. The display device displays the pointer 205 in such a manner that the pointer 25 corresponds to the calculated coordinates.

FIG. 4A(c) illustrates a case where the user moves the remote controller 200 away from the display 180 in a state where a specific button within the remote controller 200 is held down. Accordingly, a selection area within the display 180, which corresponds to the pointer 205, is zoomed in so that the selection area is displayed in an enlarged manner. Conversely, in a case where the user causes the remote controller 200 to approach the display 180, the selection area within the display 180, which corresponds to the pointer 205, is zoomed out so that the selection is displayed in a reduced manner. On the other hand, in a case where the remote controller 200 moves away from the display 180, the selection area may be zoomed out, and in a case where the remote controller 200 approaches the display 180, the selection area may be zoomed in.

On the other hand, an upward or downward movement, or a leftward or rightward movement is not recognized in a state where a specific button within the remote controller 200 is held down. That is, in a case where the remote controller 200 moves away from or approaches the display 180, only a forward or backward movement is set to be recognized without the upward or downward movement, or the leftward or rightward movement being recognized. Only the pointer 205 moves as the remote controller 200 moves upward, downward, leftward, or rightward, in a state where a specific button within the remote controller 200 is not held down.

On the other hand, a moving speed or a moving direction of the pointer 205 corresponds to a moving speed or a moving direction of the remote controller 200, respectively.

Figure 4B:
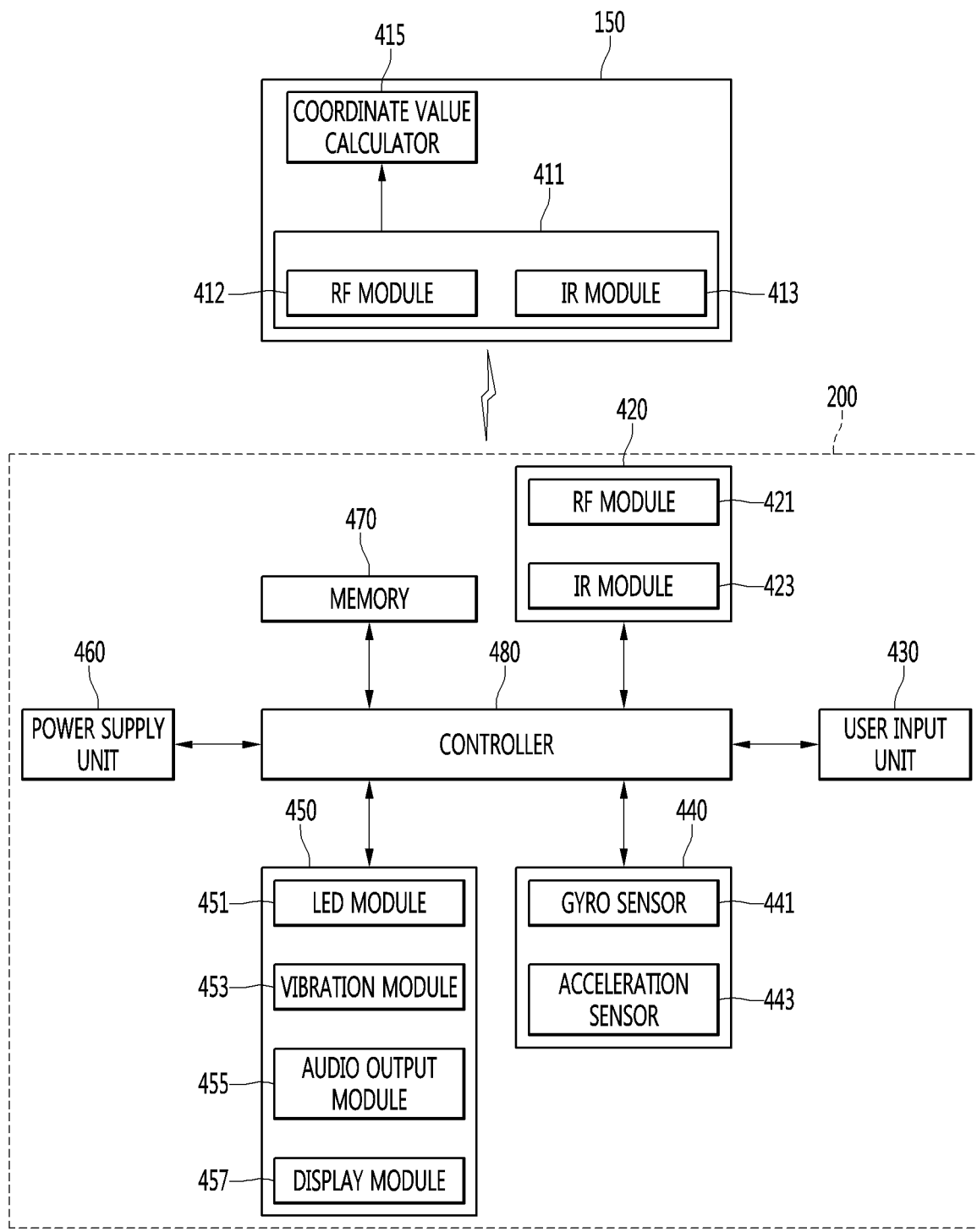
FIG. 4B is a block diagram of the inside of the remote controller in FIG. 2.

FIG. 4B is a block diagram of the inside of the remote controller in FIG. 2.

For description with reference to the drawings, the remote controller 200 includes a wireless communication unit 420, a user input unit 430, a sensor unit 440, an output unit 450, a power supply unit 460, a memory 470, and a controller 480.

The wireless communication unit 420 transmits and receives a signal to and from an arbitrary one of the display devices according to the embodiments of the present invention, which are described above. Of the display devices according to the embodiments of the present invention, one display device is taken as an example for description.

According to the present embodiment, the remote controller 200 includes an RF module 421 that transmits and receives a signal to and from the display device 100 in compliance with RF communication standards. In addition, the remote controller 200 includes an IR module 423 that possibly transmits and receives a signal to and from the display device 100 in compliance with IR communication standards.

According to the present embodiment, the remote controller 200 transfers a signal containing information on the movement of the remote controller 200 to the display device 100 through the RF module 421.

In addition, the remote controller 200 receives a signal transferred by the display device 100, through the RF module 421. In addition, the remote controller 200 transfers a command relating to power-on, power-off, a channel change, or a volume change, to the display device 100, through the IR module 423, whenever needed.

The user input unit 430 is configured with a keypad, buttons, a touch pad, a touch screen, or so on. The user inputs a command associated with the display device 100 into the remote controller 200 by operating the user input unit 430. In a case where the user input unit 430 is equipped with a physical button, the user inputs the command associated with the display device 100 into the remote controller 200 by performing an operation of pushing down the physical button. In a case where the user input unit 430 is equipped with a touch screen, the user inputs the command associated with the display device 100 into the remote controller 200 by touching on a virtual key of the touch screen. In addition, the user input unit 430 may be equipped with various types of input means operated by the user, such as a scroll key or a jog key, and the present embodiment does not impose any limitation on the scope of the present invention.

The sensor unit 440 includes a gyro sensor 441 or an acceleration sensor 443. The gyro sensor 441 senses information on the movement of the remote controller 200.

As an example, the gyro sensor 441 senses the information on operation of the remote controller 200 on the x-, y-, and z-axis basis. The acceleration sensor 443 senses information on the moving speed and so on of the remote controller 200. On the other hand, a distance measurement sensor is further included. Accordingly, a distance to the display 180 is sensed.

The output unit 450 outputs an image or an audio signal that corresponds to the operating of the user input unit 430 or corresponds to a signal transferred by the display device 100. Through the output unit 450, the user recognizes whether or not the user input unit 430 is operated or whether or not the display device 100 is controlled.

As an example, the output unit 450 includes an LED module 451, a vibration module 453, an audio output module 455, or a display module 457. The LED module 451, the vibration module 453, the audio output module 455, and the display module 457 emits light, generates vibration, outputs audio, or outputs an image, respectively, when the input unit 435 is operated, or a signal is transmitted and received to and from the display device 100 through a wireless communication unit 420.

The power supply unit 460 supplies a power to the remote controller 200. In a case where the remote controller 200 does not move for a predetermined time, the power supply unit 460 reduces power consumption by interrupting power supply. In a case where a predetermined key provided on the remote controller 200 is operated, the power supply unit 460 resumes the power supply.

Various types of programs, pieces of application data, and so on that are necessary for control or operation of the remote controller 200 are stored in the memory 470. In a case where the remote controller 200 transmits and receives a signal to and from the display device 100 in a wireless manner through the RF module 421, the signal is transmitted and received in a predetermined frequency band between the remote controller 200 and the display device 100. The controller 480 of the remote controller 200 stores information on, for example, a frequency band in which data is transmitted and received in a wireless manner to and from the display device 100 paired with the remote controller 200, in the memory 470, and makes a reference to the stored information.

The controller 480 controls all operations associated with the control by the remote controller 200. The controller 480 transfers a signal that corresponds to operating of a predetermined key of the user input unit 430, or a signal that corresponds to the movement of the remote controller 200, which is sensed in the sensor unit 440, to the display device 100 through the wireless communication unit 420.

A user input interface 150 of the display device 100 includes a wireless communication unit 411 that transmits and receives a signal in a wireless manner to and from the remote controller 200, and a coordinate value calculator 415 that calculates a coordinate value of the pointer, which corresponds to the operation of the remote controller 200.

The user input interface 150 transmits and receives the signal in a wireless manner to and from the remote controller 200 through the RF module 412. In addition, a signal transferred in compliance with the IR communication standards by the remote controller 200 through the IR module 413 is received.

The coordinate value calculator 415 calculates a coordinate value (x, y) of the pointer 205 to be displayed on the display 180, which results from compensating for a hand movement or an error, from a signal that corresponds to the operation of the remote controller 200, which is received through the wireless communication unit 411.

A transfer signal of the remote controller 200, which is input into the display device 100 through the user input interface 150 is transferred to the controller 170 of the display device 100. The controller 170 determines information on the operation of the remote controller 200 and information on operating of a key, from the signal transferred by the remote controller 200, and correspondingly controls the display device 100.

As another example, the remote controller 200 calculates a coordinate value of a pointer, which corresponds to the operation of the remote controller 200, and outputs the calculated value to the user input interface 150 of the display device 100. In this case, the user input interface 150 of the display device 100 transfers information on the received coordinate values of the pointer, to the controller 170, without performing a process of compensating for the hand movement and the error.

In addition, as another example, unlike in the drawings, it is also possible that the coordinate value calculator 415 is included within the controller 170 instead of the user input interface 150.

Figure 5:
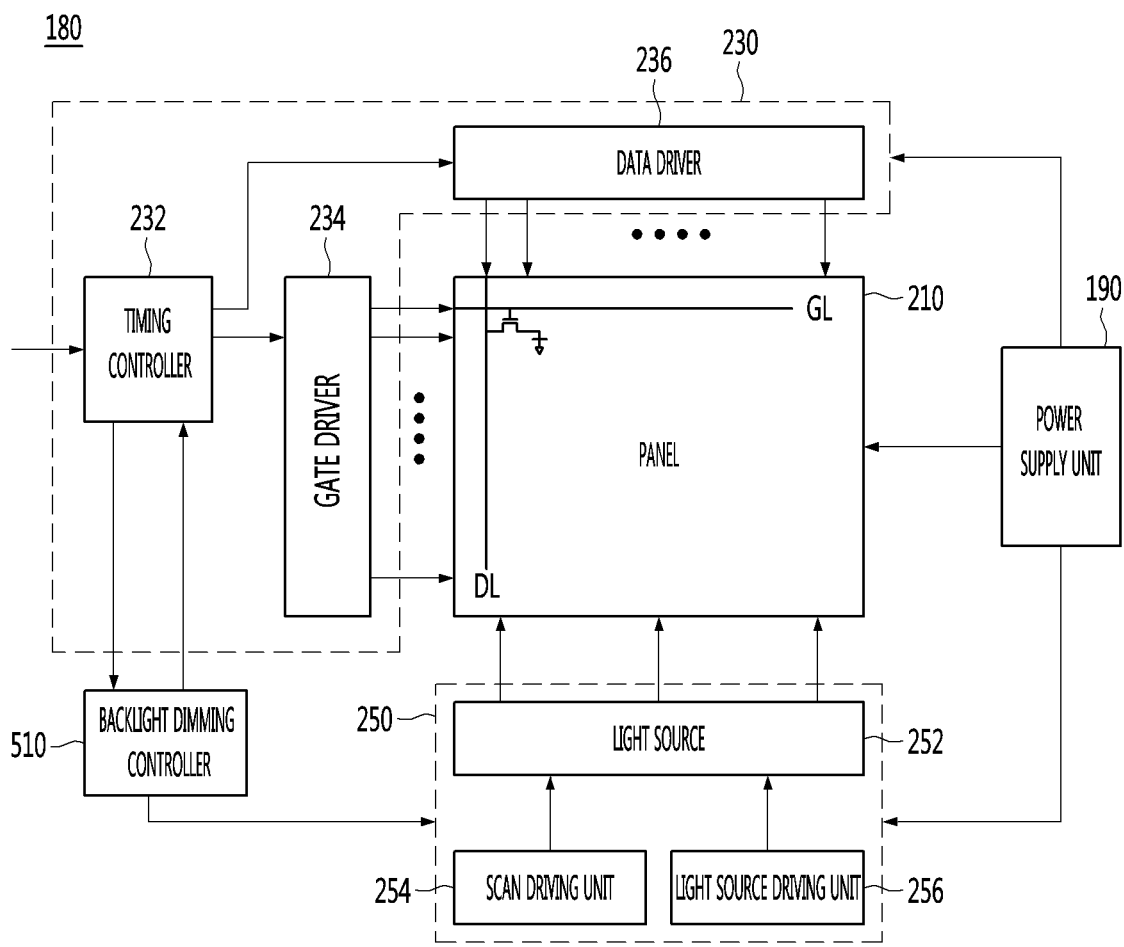
FIG. 5 is a block diagram of the inside of the power supply unit and the display of FIG. 2.

FIG. 5 is a block diagram of the inside of the power supply unit and the display of FIG. 2.

Referring to the figure, the display module 180 based on a liquid crystal panel (LCD panel) may include a liquid crystal display panel 210, a driving circuit unit 230, a backlight unit 250, and a backing dimming controller 510.

The liquid crystal display panel 210, in order to display an image, includes: a first substrate in which a plurality of gate lines GL and data lines DL are disposed across each other in a matrix shape, thin film transistors and pixel electrodes connected with the thin film transistors are formed at the intersections; a second substrate having common electrodes; and a liquid crystal layer formed between the first substrate and the second substrate.

The driving circuit unit 230 drives the liquid crystal display panel 210 in response to a control signal and a data signal that are supplied from the controller 170 of FIG. 1. To this end, the driving circuit unit 230 includes a timing controller 232, a gate driver 234, and a data driver 236.

The timing controller 232 receives a control signal, R, G, B data signal, a vertical synchronization signal Vsync etc. from the controller 170, controls the gate driver 234 and the data driver 236 in response to the control signal, and rearranges and provides the R, G, B data signal to the data driver 236.

By control of the gate driver 234, the data driver 236, and the timing controller 232, a scan signal and an image signal are supplied to the liquid crystal display panel 210 through a gate line GL and a data line DL.

The backlight unit 250 supplies light to the liquid crystal display panel 210. To this end, the backlight unit 250 may include a plurality of light sources 252, a scan driving unit 254 that controlling scanning driving of the light sources 252, and a light source driving unit 256 that turns on/off the light sources 252.

A predetermined image is displayed using light emitted from the backlight unit 250 with the light transmittance of the liquid crystal layer adjusted by an electric field generated between the pixel electrode and the common electrode of the liquid crystal display panel 210.

The power supply unit 190 can supply a common electrode voltage Vcom to the liquid crystal display panel 210 and a gamma voltage to the data driver 236. Further, the power supply unit 190 can supply driving power for driving the light sources 252 to the backlight unit 250.

Meanwhile, the backlight unit 250 can be divided and driven into a plurality of blocks. The controller 170 can control the display 180 to perform local dimming by setting a dimming value for each block. In detail, the timing controller 232 can output input image data RGB to the backlight dimming controller 510 and the backlight dimming controller 510 can calculate a dimming value for each of a plurality of blocks on the basis of the input image data RGB received from the timing controller 232.

Figure 6:
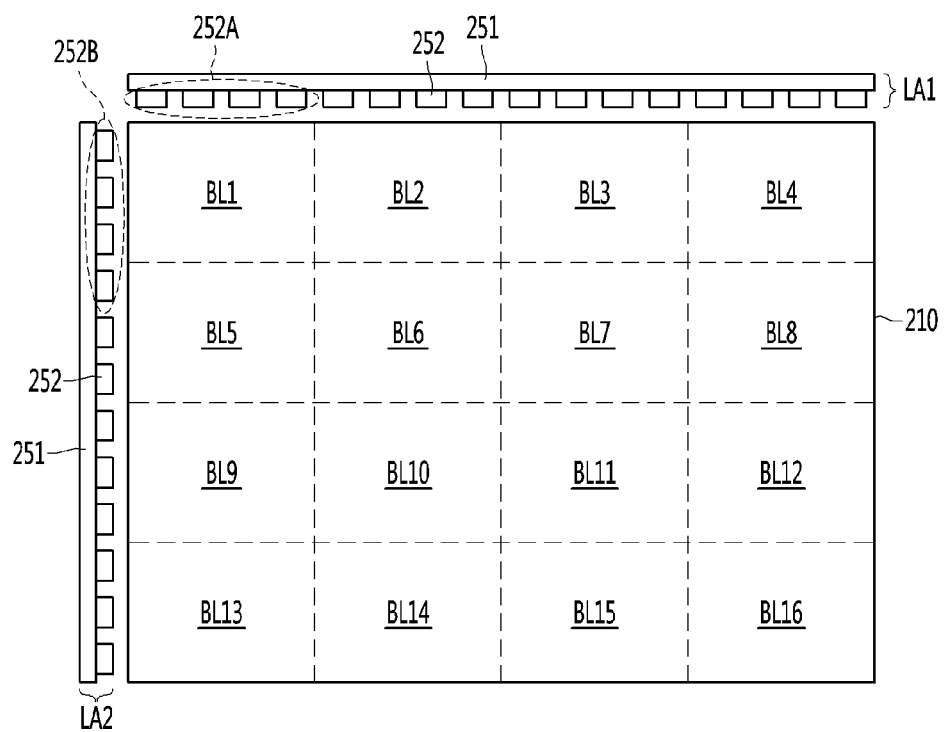
FIG. 6 is an example showing arrangement of a liquid crystal display panel and light sources in an edge-type backlight unit.
Figure 7:
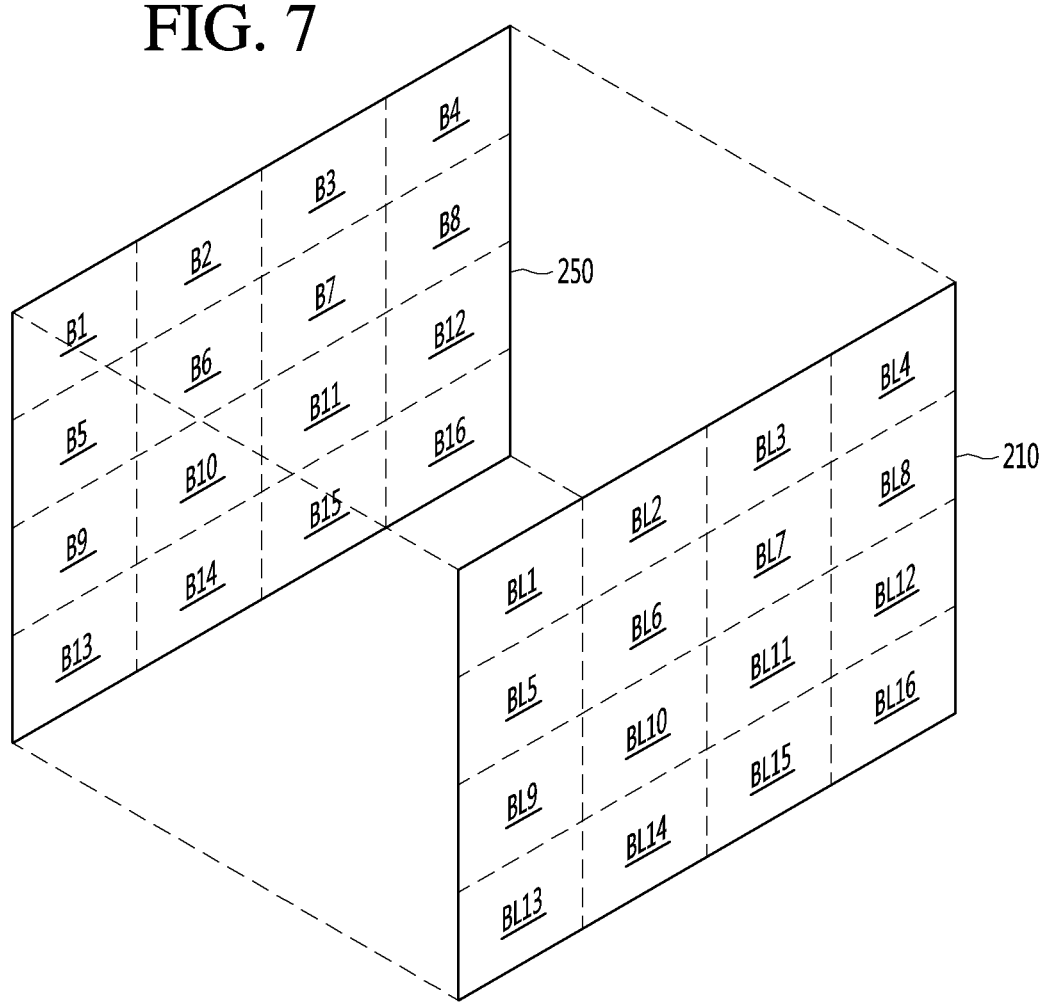
FIG. 7 is an example showing arrangement of a liquid crystal display panel and light sources in a direct-type backlight unit.

FIG. 6 is an example showing arrangement of a liquid crystal display panel and light sources in an edge type backlight unit and FIG. 7 is an example showing arrangement of a liquid crystal display panel and light sources in a direct-type backlight unit.

The liquid crystal display panel 210 may be divided into a plurality of virtual blocks, as shown in FIGS. 6 and 7. Although the liquid crystal display panel 210 is equally divided into sixteen blocks BL1~BL16 in FIGS. 6 and 7, it should be noted that the liquid crystal display panel 210 is not limited thereto. Each of the blocks may include a plurality of pixels.

The backlight unit 250 may be implemented into any one of an edge type and direct type.

The edge-type backlight unit 250 has a structure in which a plurality of optical sheets and a light guide plate are stacked under the liquid crystal display panel 210 and a plurality of light sources is disposed on the sides of the light guide plate. When the backlight unit 250 is an edge-type backlight unit, the light sources are disposed on at least any one of the top and the bottom and at least any one of the left and right sides of the liquid crystal display panel 210. It is exemplified in FIG. 6 that a first light source array LA1 is disposed on the top of the liquid crystal display panel 210 and a second light source array LA2 is disposed on the left side of the liquid crystal display panel 210. The first and second light source arrays LA1 and LA2 each include a plurality of light sources 252 and a light source circuit board 251 on which the light sources 252 are mounted. In this case, the brightness of the light traveling into the first block BL2 of the light source array can be adjusted using the light sources 252A of the first light source array LA1 disposed at a position corresponding to the first block BL2 and the light sources 252B of the second light source array LA2.

The direct-type backlight unit 250 has a structure in which a plurality of optical sheets and a diffuser plate are stacked under the liquid crystal display panel 210 and a plurality of light sources is disposed under the diffuser plate. When the backlight unit 250 is a direct-type backlight unit, it is divided to correspond one to one to the blocks BL1~BL16 of the liquid crystal display panel 210, as shown in FIG. 7. In this case, the brightness of the light traveling into the first block BL2 of the light source array can be adjusted using the light sources 252 included in the first block BL1 of the backlight unit 250 disposed at a position corresponding to the first block BL1 of the liquid crystal display panel 210.

The light sources 252 may be point light sources such as a Light Emitting Diode (LED). The light sources 252 are turned on and off in response to light source driving signals LDS from the light source driving unit 256. The light sources 252 can be adjusted in intensity of light in accordance with the amplitudes of the light source driving signals LDS and can be adjusted in turning-on time in accordance with the pulse width. The brightness of light that is outputted from the light sources 252 may be adjusted in accordance with the light source driving signal LDS.

The light source driving unit 256 can generate and output light source driving signals LDS to the light sources 252 on the basis of the dimming values of the blocks inputted from the backlight dimming controller 510. The dimming values of the blocks, which are values for performing local dimming, may be the brightness of the light that is outputted from the light sources 252.

Figure 8:
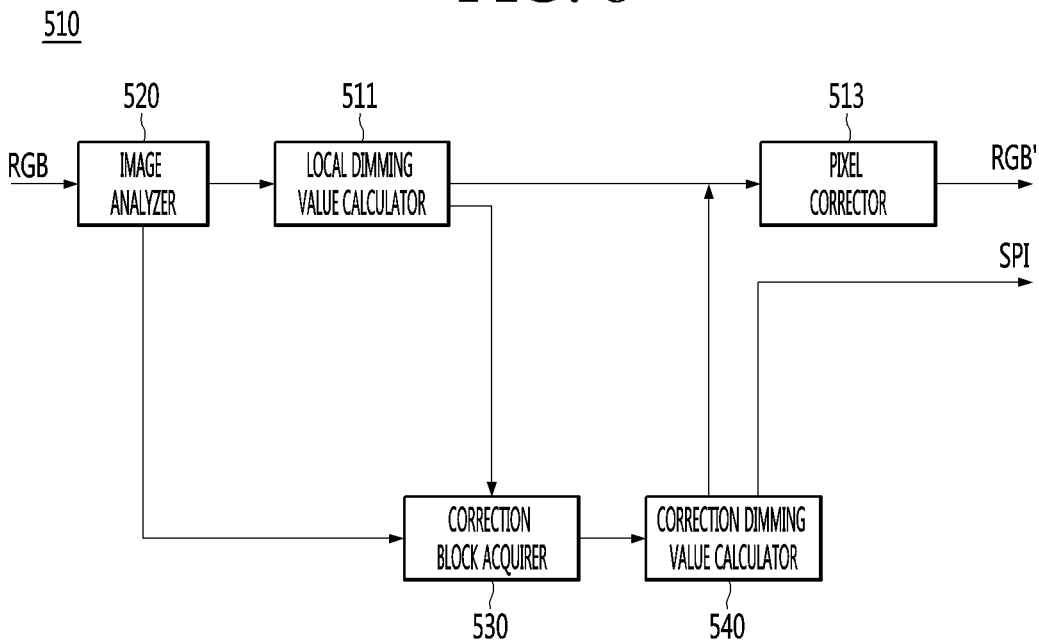
FIG. 8 is a block diagram of the inside of a backlight dimming controller according to an embodiment of the present invention.

FIG. 8 is a block diagram of the inside of a backlight dimming controller according to an embodiment of the present invention.

As shown in FIG. 8, the backlight dimming controller 510 may include at least some or all of a local dimming value calculator 511, a pixel corrector 513, a correction block acquirer 530, and a correction dimming value calculator 540.

The local dimming value calculator 511 can receive input image data RGB from the controller 170 or the image analyzer 520 and calculate a dimming value for each of a plurality of blocks on the basis of the received input image data RGB.

The local dimming value calculator 511 can calculate the dimming value of the blocks on the basis of the average brightness and the maximum brightness of the pixels of each block, and the brightness of surrounding blocks.

For example, the local dimming value calculator 511 may select a small value of a set maximum value and an average considering a weight for each pixel value as an initial dimming value, and when the initial dimming value is larger than the average brightness and the average brightness is smaller than a threshold value, the local dimming value calculator 511 may reinforce the dimming value through the weight by recognizing it as a dark area.

As another example, the local dimming value calculator 511 can calculate a representative value of each block by analyzing the input image data RGB for each block of the liquid crystal display panel 210. The representative value may be the sum of the input image data RGB of each block, the average value of the input image data RGB of each block, or the maximum value of the input image data RGB of each block. The local dimming value calculator 511 can calculate dimming values of the blocks in accordance with the representative values of the blocks. The local dimming value calculator 511 can calculate the dimming value of any one block in proportion to the representative value of the block. Accordingly, the larger the representative value of any one block, the larger the dimming value of the block can be calculated.

Further, the local dimming value calculator 511 can calculate a dimming value of each block in various methods on the basis of the input image data RGB. That is, the local dimming value calculator 511 can calculate dimming values such that the brightness of the light that is outputted by the light sources 252 of a block corresponding to a dark portion of an image is decreased and the brightness of the light that is outputted by the light sources 252 of a block corresponding to a bright portion of the image.

The pixel corrector 513 can compensate for the image input data RGB of any one block as much as the reduction of the dimming value of the block. For example, when the dimming value of any one block decreases less than a reference value, light with half brightness is provided from the light sources 252, as compared with when local dimming is not performed. In this case, since the luminance of the corresponding block of the liquid crystal display panel 210 becomes too low, the pixel corrector 513 can increase the input image data RGB of the corresponding block of the liquid crystal display panel 210. When the dimming value of the corresponding block decreases with a predetermined portion, how much proportion the input image data RGB of the corresponding block should be adjusted with may be set in advance.

As described above, according to an embodiment of the present invention, the backlight dimming controller 510 calculates a dimming value of each of a plurality of blocks through the local dimming value calculator 511 and performs local dimming by correcting the input image data RGB on the basis of the dimming value through the pixel corrector 513, thereby being able to improve the contrast of the output image. However, even in this case, the area corresponding to a high-frequency component of an image may be lower in a contrast improvement effect than an area corresponding to a low-frequency component.

Accordingly, the backlight dimming controller 510 can acquire data loss blocks of a plurality of blocks and can correct the dimming values of the acquired data loss blocks.

The backlight dimming controller 510 may include the correction block acquirer 530 that acquires data loss blocks of a plurality of blocks.

The data loss block may mean a block corresponding to an area in which the degree of deformation of an image is a set reference or more, when an image having undergone local dimming and an image having not undergone local dimming are compared.

An image may be divided into a low-frequency component and a high-frequency component when it is converted into a space frequency area. A data loss block includes a portion corresponding to a high-frequency component in an area and the high-frequency component may mean a portion having a large color difference from the surrounding area. Meanwhile, the low-frequency component may mean a portion having a less color difference from the surrounding area.

An image may be expressed by a frequency component through a method such as 2D-DCT or Fourier transform.

The correction block acquirer 530 can acquire a data loss block on the basis of the difference between an image according to input image data RGB and an image corresponding to the dimming value for each of a plurality of blocks calculated by the local dimming value calculator 511.

In detail, assuming that an image to be outputted in accordance with input image data RGB of a plurality of blocks is a first image and an input to be outputted in accordance with the dimming value of each of a plurality of blocks calculated on the basis of the input image data RGB by the local dimming value calculator 511 is a second image, the correction block acquirer 530 can compare the first image and the second image and recognize a block having a large difference between the first image and the second image, as the result of comparison, as a data loss block.

The correction block acquirer 530 can acquire a data loss block by comparing the first image and the second image using at least one of a Structural Similarity Index (SSIM), a Peak Signal-to-Noise Ratio (PSNR), and a Mean Square Error (MSE).

The SSIM, which means a structural similarity index, may be a method of measuring similarity with an original image against distortion generated by compression, conversion, etc.

Assuming that 'x' means a first image that is an original image and 'y' means a second image that is a distorted image due to local dimming, the SSIM can be calculated in accordance with the following Formula 1 and Formula 2.

$$l(x, y) = \frac{2\mu_x\mu_y}{\mu_x^2 + \mu_y^2}, c = \frac{2\sigma_x\sigma_y}{\sigma_x^2 + \sigma_y^2}, s(x, y) = \frac{2\sigma_{xy}}{\sigma_x\sigma_y}$$ [Formula 1]

$$S(x, y) = l(x, y) \cdot c(x, y) \cdot s(x, y) = \frac{4\mu_x\mu_y\sigma_{xy}}{(\mu_x^2 + \mu_y^2)(\sigma_x^2 + \sigma_y^2)}$$ [Formula 2]

$\mu_x$ and $\mu_y$, which are averages of signals x and y, respectively, reflect the brightness of a signal. $\sigma_x$ and $\sigma_y$, which are variances of signals x and y, respectively, reflect the degree of contrast of a signal. $\sigma_{xy}$, which is a covariance of signal x and y, may reflect correlation of two signal.

The PSNR, which is a maximum signal-to-noise ratio, shows the ratio of noise to the maximum signal that a signal can have and may be a method of measuring image quality loss information due to image or moving image compression. The PSNR can be calculated in accordance with the following Formula 3.

$$PSNR = 10\log\frac{s^2}{MSE}$$ [Formula 3]

S is the maximum value of the corresponding image and can be acquired by subtracting the minimum value from the maximum value of the corresponding channel. The MSE may be a value that is calculated through the following Formula 4.

The MSE, which means a mean square error, may show a measurement value for the difference of the pixel values of an original image and a distorted image, comparing the two images. The MSE can be calculated in accordance with the following Formula 4.

$$MSE = \frac{1}{NM}\sum_{m=0}^{M-1}\sum_{n=0}^{N-1}e(m, n)^2$$ [Formula 4]

The correction block acquirer 530 can acquire a data loss block on the basis of at least one of the SSIM, the PSNR, and the MSE of the first image and the second image.

For example, the correction block acquirer 530 can calculate the SSIM of the first image and the second image and can acquire a block of which the SSIM is less than a predetermined reference value as a data loss block. The SSIM may be calculated as a value between 0 and 1 and the correction block acquirer 530 can acquire a block of which the SSIM is 0.8 or less as a data loss block. However, 0.8 is exemplified for the convenience of description and the reference value may be set within the range of 0 and less than 1.

The correction block acquirer 530 can output the information of the acquired data loss block to the correction dimming value calculator 540.

The correction dimming value calculator 540 can receive the information of the data loss block from the correction block acquirer 530 and can calculate a dimming value of each of a plurality of blocks on the basis of the input information of the data loss block. That is, the correction dimming value calculator 540 can correct the dimming values of the blocks calculated by the local dimming value calculator 511.

The correction dimming value calculator 540 can correct the dimming values larger than the maximum dimming value when the local dimming value calculator 511 calculates dimming values. For example, the maximum dimming value that is set when the local dimming value calculator 511 calculates a dimming value of each block may be 220, and the correction dimming value calculator 540 can adjust the dimming values larger than the maximum dimming value.

The pixel corrector 513 can correct input image data RGB on the basis of the dimming value of each of a plurality of blocks corrected by the local dimming value calculator 511, and can output the corrected image data RGR'. The pixel corrector 513 can output the corrected image data RGB' to the timing controller 232 and the timing controller 232 can output the corrected image data RGB' to the data driver 230.

Meanwhile, the correction dimming value calculator 540 can output the corrected dimming values of the blocks to the backlight unit 250, particularly, the light source driving unit 256 in a Serial Pheripheral interface (SPI) data format.

On the other hand, the backlight dimming controller 510 may further include the image analyzer 520.

The image analyzer 520 can extract a high-frequency component by analyzing an input image on the basis of input image data RGB. The image analyzer 520 can extract an outline, a texture, etc. from an image. The image analyzer 520 may include a high pass filter.

The image analyzer 520 can output the input image data RGB to the local dimming value calculator 511 and can output information obtained through image analysis on the basis of the input image data RGB to the correction block acquirer 530.

The correction block acquirer 530 may acquire a data loss block on the basis of the image analysis information received from the image analyzer 520 and the dimming values of the blocks received from the local dimming value calculator 511.

Meanwhile, when the dimming values of the blocks are not corrected, the local dimming value calculator 511 can directly output the dimming values of the blocks calculated by the local dimming value calculator 511 to the backlight unit 250 in the SPI data format, as shown in FIG. 8.

Figure 9:
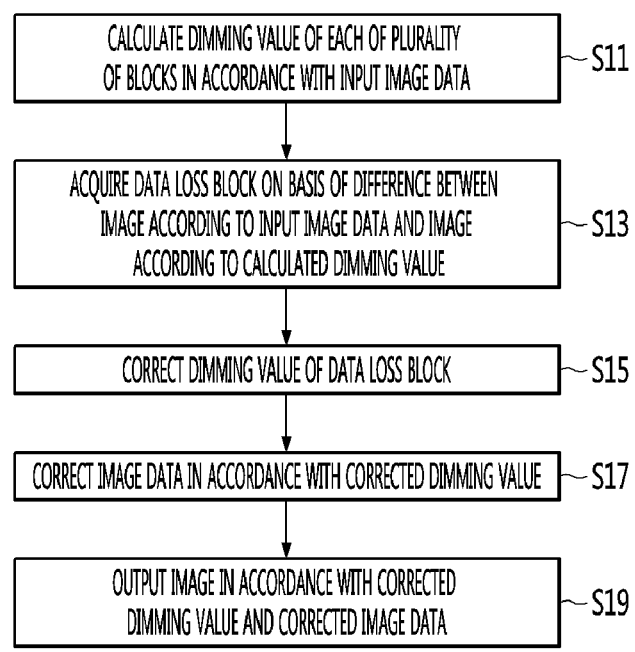
FIG. 9 is a flowchart of a method of driving a liquid crystal display device according to an embodiment of the present invention.

FIG. 9 is a flowchart of a method of driving a liquid crystal display device according to an embodiment of the present invention.

The backlight dimming controller 510 can calculate a dimming value of each of a plurality of blocks in accordance with input image data RGB (S11).

The local dimming value calculator 511 can calculate a dimming value of each of a plurality of blocks on the basis of the input image data RGB. The local dimming value calculator 511 can calculate the dimming value of each of a plurality of blocks such that the dimming values of the blocks do not exceed a predetermined maximum dimming value. For example, when the maximum dimming value is set as 220, the local dimming value calculator 511 can calculate dimming values of each of a plurality of blocks such that the dimming values of the blocks are 220 or less.

When the dimming value of a block exceeds 220 in accordance with input image data, the local dimming value calculator 511 can adjust output brightness by setting the dimming value of the corresponding block 220 or less and then adjusting the transmittance by correcting the image data.

The backlight dimming controller 510 can acquire a data loss block on the basis of the difference between the image according to the input image data RGB and the image according to the calculated dimming value (S13).

The correction block acquirer 530 can acquire a data loss block.

The correction block acquirer 530 can acquire a data loss block on the basis of the structural difference between an image according to input image data RGB and an image corresponding to the dimming value calculated by the local dimming value calculator 511.

The backlight dimming controller 510 can correct the dimming value of the data loss block (S15).

The correction dimming value calculator 540 can correct the dimming value of the data loss block.

The correction dimming value calculator 540 can correct the dimming value of the data loss block larger than the maximum dimming value when the local dimming value calculator 511 calculates the dimming value of each block.

The correction dimming value calculator 540 can correct the dimming values of a block in which distortion is generated by the maximum dimming value set when the local dimming value calculator 511 calculates dimming values.

The backlight dimming controller 510 can correct the image data in accordance with the corrected dimming value (S17).

The pixel corrector 513 can correct the image data. The pixel corrector 513 can correct the image data for the corrected dimming value of the data loss block. For example, when the dimming value of any one data loss block increases higher than the reference value, brighter light is provided from the light sources 252 than when correction is not performed, and the luminance of the corresponding block increases, so the pixel corrector 513 can decrease the image data.

If the backlight dimming controller 510 corrects only a dimming value and does not correct image data on the basis of the corrected dimming value, only the brightness of an image increases and the contrast improvement effect may be very small. Accordingly, when correcting the dimming value of at least one of a plurality of blocks, the backlight dimming controller 510 according to an embodiment of the present invention can correct image data on the basis of the corrected dimming value.

The backlight dimming controller 510 can output an image in accordance with the corrected dimming value and the corrected image data RGB' (S19).

The actual output brightness of an image is calculated by applying transmittance according to image data and light source brightness according to a dimming value to a predetermined function, and as the range of the dimming value increases, the range of the actual output brightness of the image increases, so the ability to express an image can be improved.

Assuming that it is local dimming to calculate a dimming value of each of a plurality of blocks and drive the backlight unit 250, it may be referred to as improved local dimming to calculate a dimming value of each of a plurality of blocks and then drive the backlight unit 250 by correcting the dimming value of at least one block, as described above through the flowchart. However, these names are only exemplified for the convenience of description and the present invention is not limited thereto.

Figure 10:
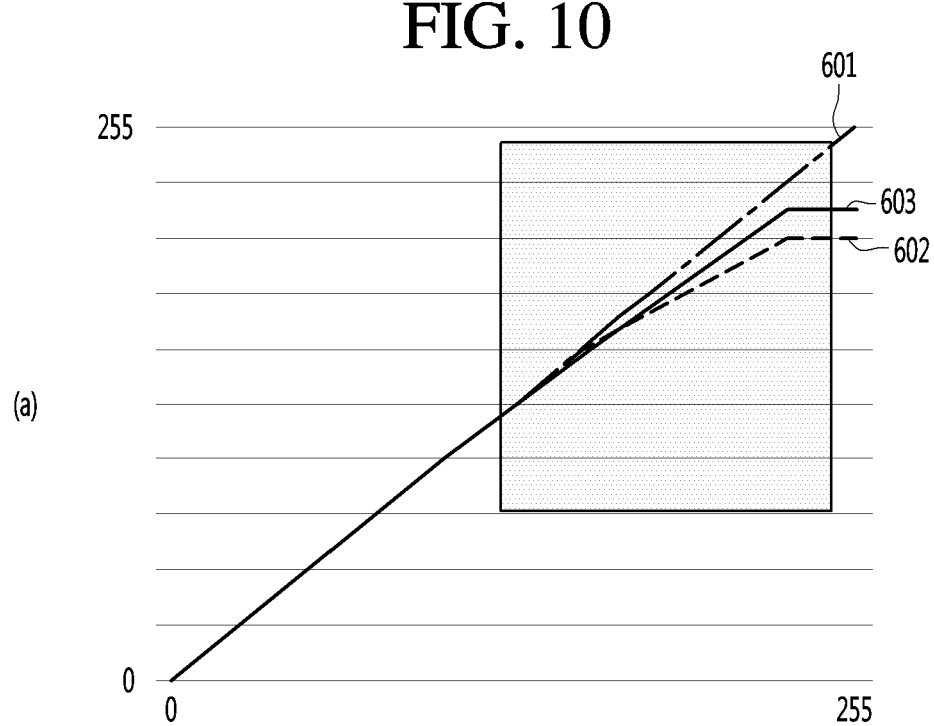
FIG. 10 is a graph showing output brightness of an actual image according to input image data in a liquid crystal display device according to an embodiment of the present invention.
Figure 10:
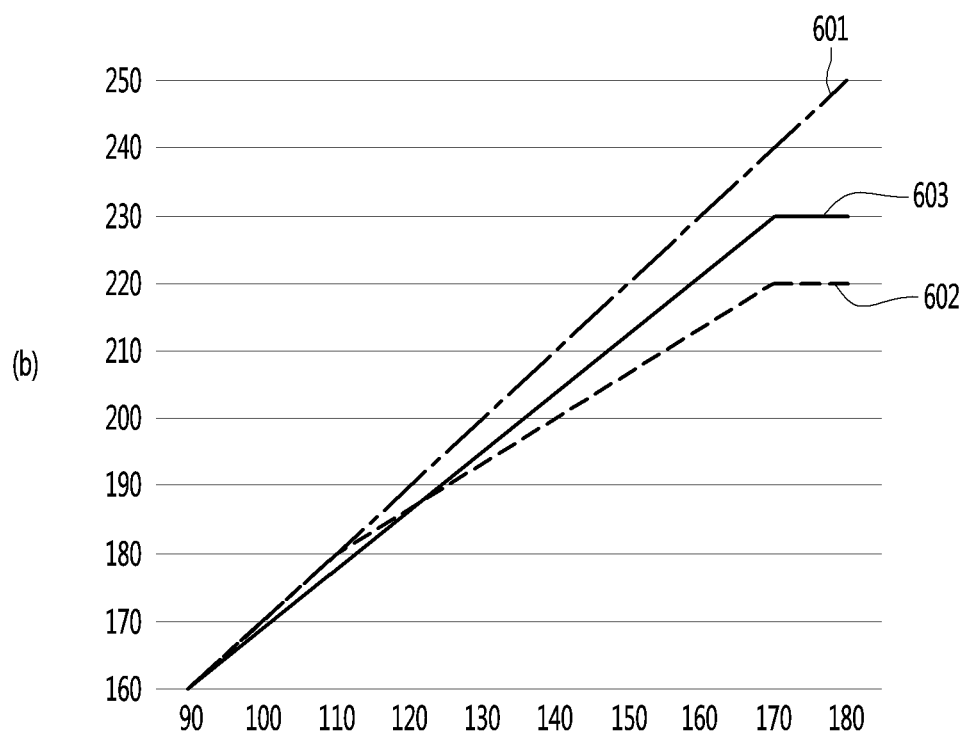

FIG. 10 is a graph showing output brightness of an actual image according to input image data in a liquid crystal display device according to an embodiment of the present invention. (a) of FIG. 10 is an enlarged view of the area indicated by a box in (a) of FIG. 10.

In FIG. 10, the x-axis may be the brightness of an input image and the y-axis may be the actual output brightness of an input image.

In FIG. 10, a first graph 601 may show the actual output brightness when local dimming is not applied, that is, of an original image, a second graph 620 may show the actual output brightness of an image when local dimming is performed, and a third graph 603 may show the actual output brightness of an image when improved local dimming is performed.

Referring to (b) of FIG. 10, it can be seen that the actual output brightness of the original image is largest when the brightness of an image is 170 or more, the actual output brightness of an image is smallest when local dimming is performed, and the actual output brightness of an image is shown between them when improved local dimming is performed. That is, it is possible to output an actual image to be brighter when the improved local dimming is performed than when only the local dimming is performed, so the contrast can be improved.

Figure 11:
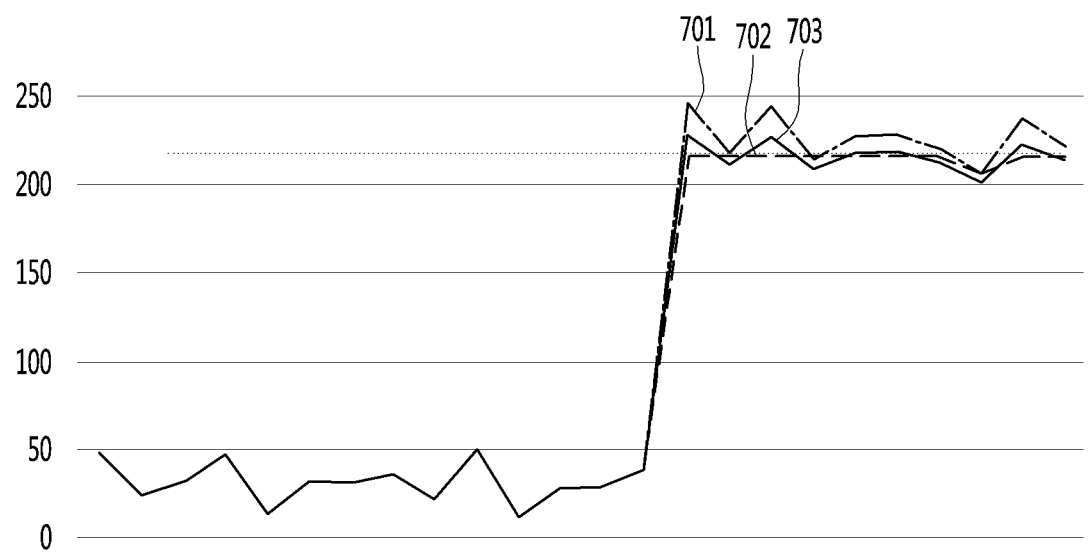
FIG. 11 is an example of a graph showing output brightness of a pixel constituting any one block of a liquid crystal display device according to an embodiment of the present invention.

FIG. 11 is an example of a graph showing output brightness of a pixel constituting any one block of a liquid crystal display device according to an embodiment of the present invention.

In FIG. 11, the x-axis may be each block included in any one block and the y-axis may be the actual output brightness of an image.

In FIG. 11, a first graph 701 may show the output brightness when local dimming is not applied, that is, of an original image, a second graph 702 may show the output brightness of a pixel when local dimming is performed, and a third graph 703 may show the output brightness of a pixel when improved local dimming is performed. It is assumed that the maximum dimming value when local dimming is performed is 220 in FIG. 11.

Referring to the second graph 702, it can be seen that a pixel having output brightness over 220 is output only with 220 in local dimming in the original image due to the maximum dimming value. That is, it can be seen that the brightness, that is, the expression of an image is reduced in local dimming.

However, referring to the third graph 703, it can be seen that the output brightness of the third graph 703 is smaller than the output brightness of the first graph 701, but the inclination change of the third graph 703 is similar to the inclination change of the first graph 701. That is, when the improve local dimming is performed, it is possible to reduce the power consumption by decreasing the brightness less than the original image and to improve the expression of an image by outputting the brightness change to be similar to the original image. That is, there is the advantage that it is possible to decreasing the power consumption and improve the contrast when performing the improved local dimming than when performing the local dimming.

Figure 12A:
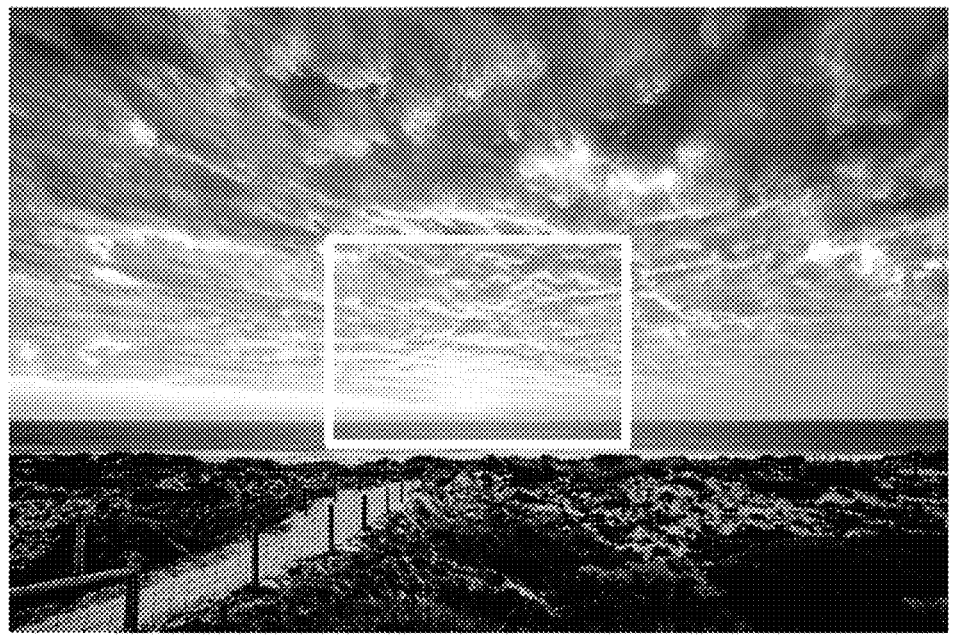
FIG. 12A is an example of an original image outputted by a liquid crystal display device according to an embodiment of the present invention.
Figure 12A:
Figure 12B:
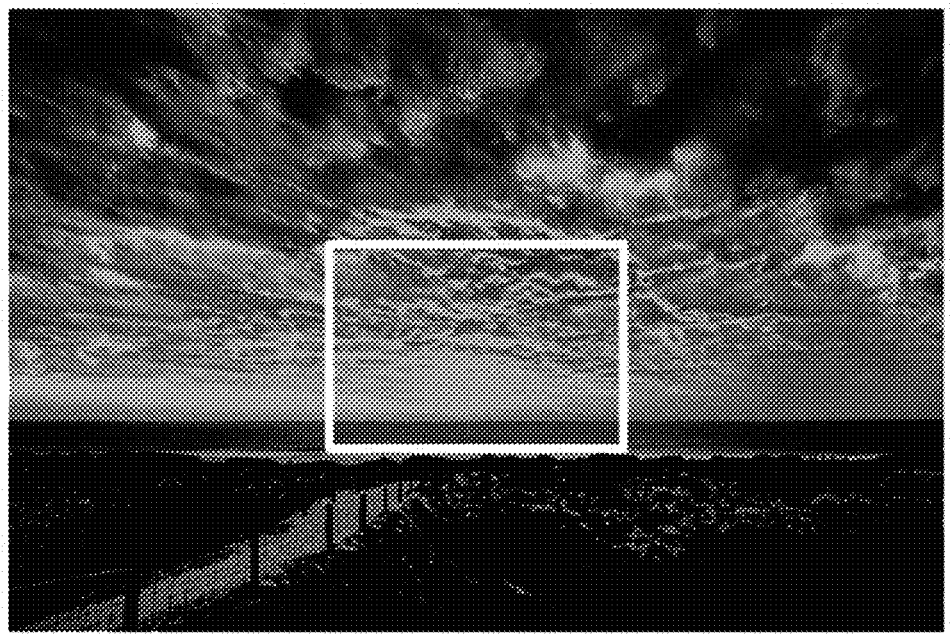
FIG. 12B is an example of an original image outputted when a liquid crystal display device according to an embodiment of the present invention performs local dimming.
Figure 12B:
Figure 12C:
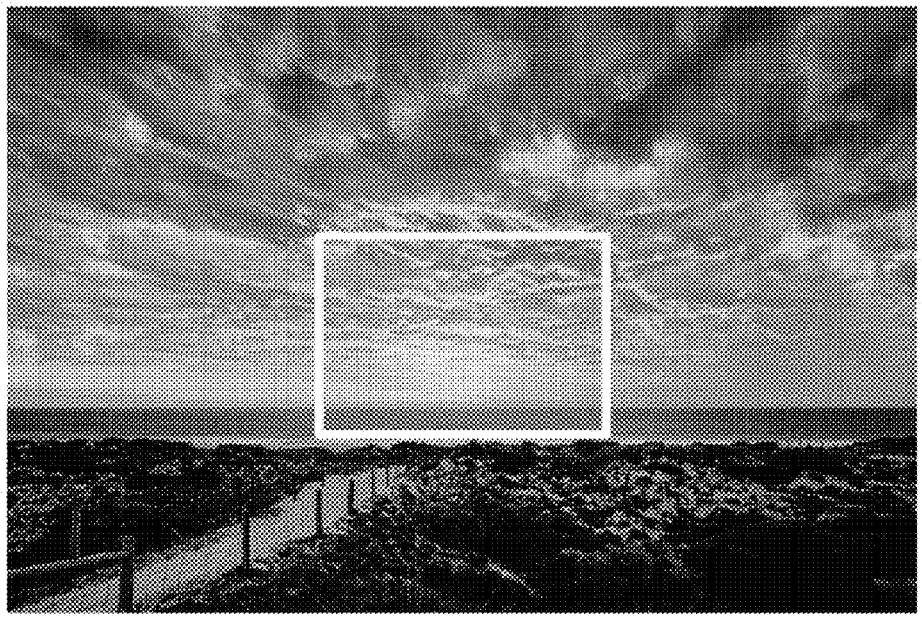
FIG. 12C is an example of an original image outputted when a liquid crystal display device according to an embodiment of the present invention performs improved local dimming.
Figure 12C:

FIG. 12A is an example of an original image output by a liquid crystal display device according to an embodiment of the present invention, FIG. 12B is an example of an original image outputted when a liquid crystal display device according to an embodiment of the present invention performs local dimming, and FIG. 12C is an example of an original image outputted when a liquid crystal display device according to an embodiment of the present invention performs improved local dimming.

The liquid crystal display device 100 can reduce power consumption by decreasing brightness by reducing the current that is supplied to the display 180 when outputting an image by performing local dimming or improved local dimming, as shown in FIGS. 12B and 12C, than when outputting an image shown in FIG. 12A. It can be seen in FIG. 12B that when local dimming is performed, the contrast is low at the area with many high-frequency components, so it is difficult to discriminate an outline etc. In particular, referring to the enlarged portion of FIG. 12B, it can be seen that most outlines have been removed and there is little brightness change of colors. However, referring to FIG. 12C in which improved local dimming was performed, the contrast is higher than the image shown in FIG. 12B, so more outlines etc. are shown than the image shown in FIG. 12B. Further, the brightness change of colors is relatively shown well, so it can be seen that details of the image are shown.

Next, the difference in dimming value when the liquid crystal display device according to an embodiment of the present invention performs local dimming and improved local dimming is described with reference to FIGS. 13 to 15.

Figure 13:
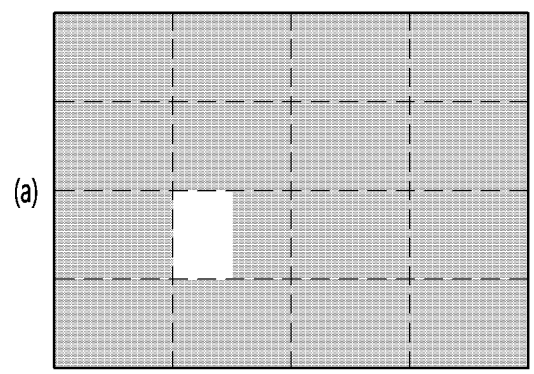
FIG. 13 is an example of an image having the same average brightness, maximum brightness, and brightness of surrounding blocks, but a difference only in the high-frequency component of a specific block.
Figure 13:
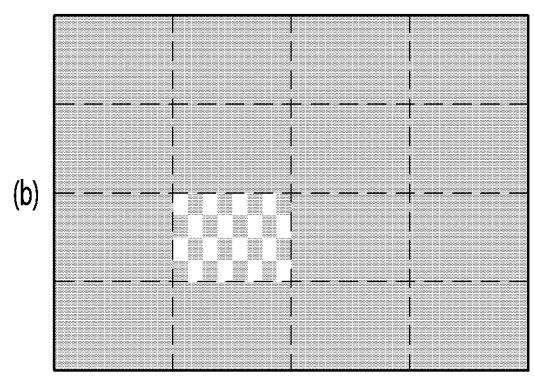

FIG. 13 is an example of an image having the same average brightness, maximum brightness, and brightness of surrounding blocks, but a difference only in the high-frequency component of a specific block.

The image display device 100 can output the image shown in (a) of FIG. 13 and the image shown in (b) of FIG. 13. Hereafter, the image (a) means the image shown in (a) of FIG. 13 and the image (b) means the image shown in (b) of FIG. 13.

The images (a) and (b) may be images in which any one block is composed of white 50% and black 50% and the other blocks are black 100%. For example, they may be images in which the tenth block is composed of white 50% and black 50%, and the first, ninth, eleventh, and sixteenth blocks are black.

However, the image (b) may have much high-frequency components than the image (a). For example, as shown in the example of FIG. 13, more boundary lines between white and black may be in the image (b) than the image (a). The image (b) may have much detailed expression components than the image (a).

Assuming that the brightness has a value in the range of 0 (black) to 255 (white), the tenth block of the image (a) and the tenth block of the image (b) may have the same average brightness of 128 and the same maximum brightness of 255.

Accordingly, when performing the image display device 100 performs local dimming, the output brightness of the light source 252 when the image (a) is outputted may be the same as the output brightness of the light source 252 when the image (b) is outputted.

However, when performing the image display device 100 performs improved local dimming, the output brightness of the light source 252 when the image (a) is outputted may be different from the output brightness of the light source 252 when the image (b) is outputted.

That is, when the average brightness and maximum brightness of the first block and the second block are the same and the second block has more high-frequency components than the first block, the local dimming value calculator 511 of the image display device 100 can calculate the dimming value of the first block and the dimming value of the second block to be the same and can correct the dimming value of the second block having more high-frequency components to be larger than the dimming value of the first block.

An example of the output brightness when the image (a) and the image (b) are outputted in accordance with local dimming and improved local dimming is described with reference to FIGS. 14 and 15.

Figure 14:
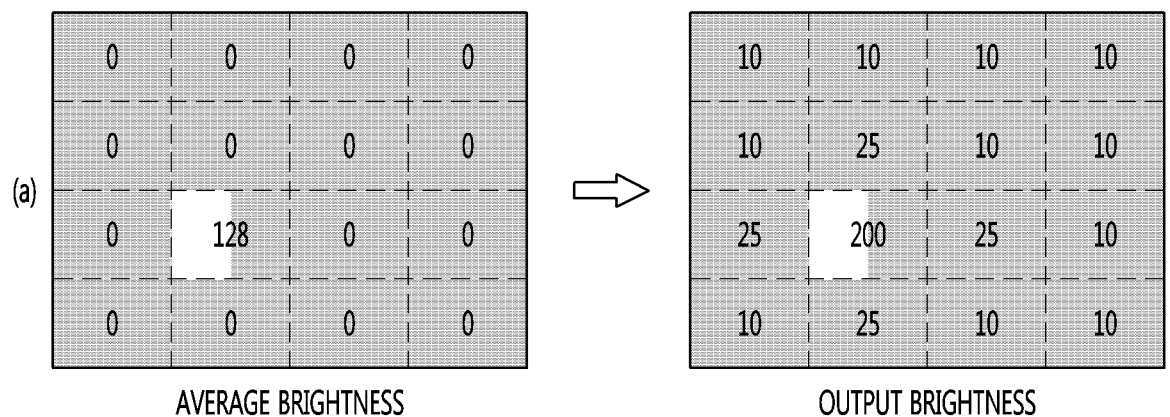
FIG. 14 is an example showing the brightness when the image (a) and the image (b) shown in FIG. 13 are outputted in accordance with local dimming.
Figure 14:
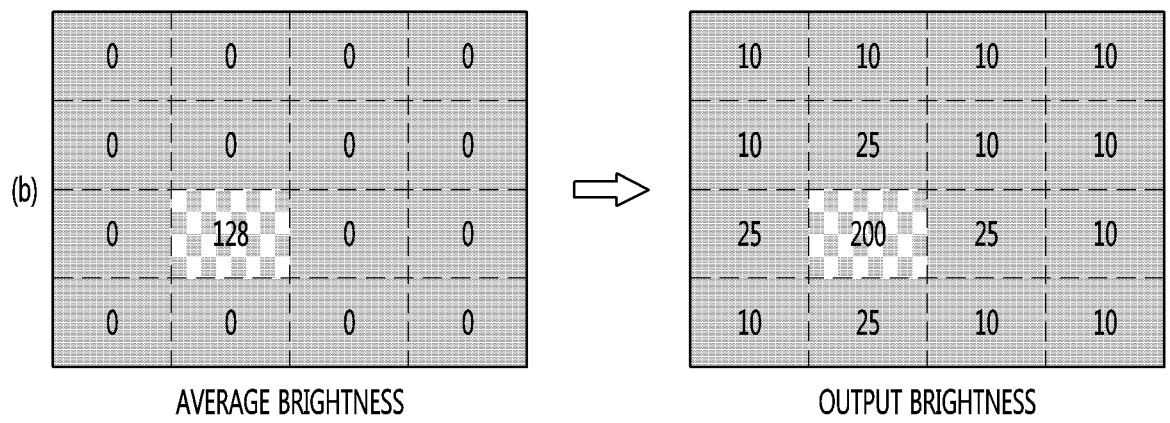

FIG. 14 is an example showing the brightness when the image (a) and the image (b) are outputted in accordance with local dimming.

In the image (a), the brightness of the first to ninth blocks and the eleventh to sixteenth blocks may be 0 and the average brightness of the tenth block may be 128. Similarly, in the image (b), the brightness of the first to ninth blocks and the eleventh to sixteenth blocks may be 0 and the average brightness of the tenth block may be 128.

When local dimming is performed and the backlight dimming controller 510 outputs the image (a), the output brightness of the first to fifth blocks, the seven and eighth bocks, the twelfth to thirteenth blocks, and the fifteenth and sixteenth blocks may be set as 10, the output brightness of the fifth, ninth, eleventh, and fourteenth blocks may be set as 25, and the output brightness of the tenth block may be set as 200.

Similarly, when local dimming is performed and the backlight dimming controller 510 outputs the image (B) of FIG. 13, the output brightness of the first to fifth blocks, the seven and eighth bocks, the twelfth to thirteenth blocks, and the fifteenth and sixteenth blocks may be set as 10, the output brightness of the fifth, ninth, eleventh, and fourteenth blocks may be set as 25, and the output brightness of the tenth block may be set as 200.

Since the output brightness is set on the basis of the average brightness and the maximum brightness of each block or the brightness of surrounding blocks in local dimming, the output brightness of the image (a) and the image (b) may be the same when an image is outputted. In particular, the tenth block may have different high-frequency components in the image (a) and the image (b), but the output brightness may be the same as 200 because high-frequency components are not considered in local dimming.

Figure 15:
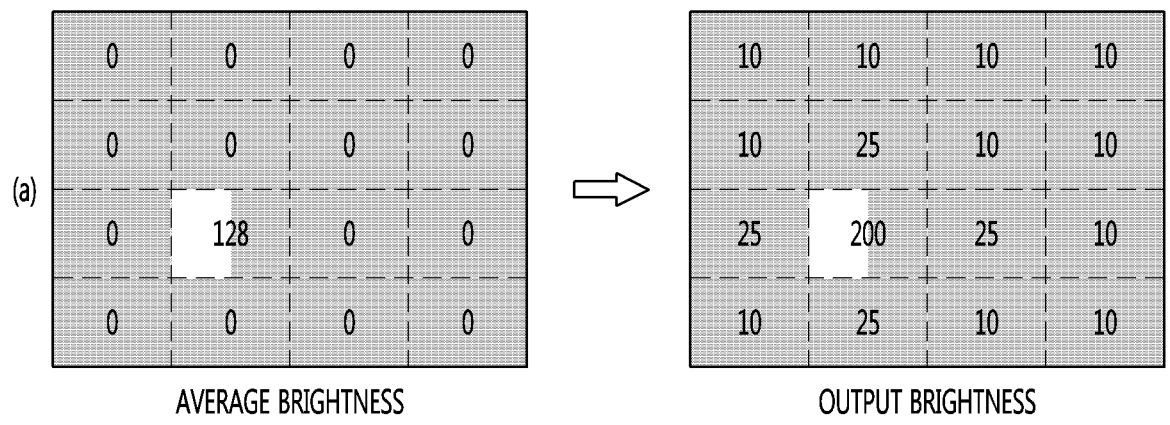
FIG. 15 is an example showing the brightness when the image (a) and the image (b) shown in FIG. 13 are outputted in accordance with improved local dimming.
Figure 15:
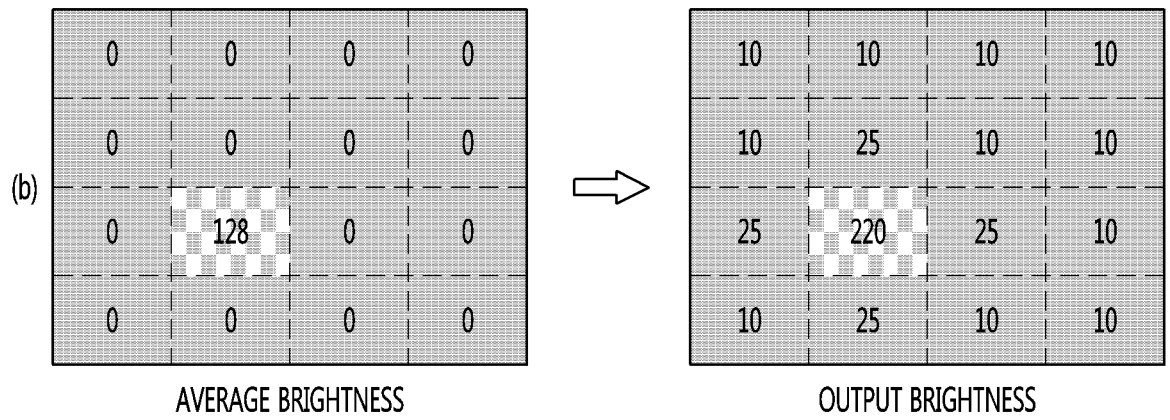

FIG. 15 is an example showing the brightness when the image (a) and the image (b) are outputted in accordance with improved local dimming.

When improved local dimming is performed and the backlight dimming controller 510 outputs the image (a), the output brightness of the first to fifth blocks, the seven and eighth bocks, the twelfth to thirteenth blocks, and the fifteenth and sixteenth blocks may be set as 10, the output brightness of the fifth, ninth, eleventh, and fourteenth blocks may be set as 25, and the output brightness of the tenth block may be set as 200.

However, when improved local dimming is performed and the backlight dimming controller 510 outputs the image (b), the output brightness of the first to fifth blocks, the seven and eighth bocks, the twelfth to thirteenth blocks, and the fifteenth and sixteenth blocks may be set as 10, the output brightness of the fifth, ninth, eleventh, and fourteenth blocks may be set as 25, and the output brightness of the tenth block may be set as 220.

This is because the output brightness is determined on the basis of not only the average brightness and the maximum brightness of each block or the brightness of surrounding blocks, but the high-frequency component of a corresponding block in improved local dimming. Accordingly, since particularly the tenth block has different high-frequency components in the image (a) and the image (b), the output brightness may be set different as 200 and 220 in improved local dimming.

As described above, when the backlight dimming controller 510 of the image display device 100 performs local dimming, the high-frequency component of an image is not considered and only the average brightness and the maximum brightness of each block are considered, so the output brightness of the light sources 252 is the same when the image (a) and the image (b) are outputted.

However, when the backlight dimming controller 510 of the image display device 100 performs improved local dimming, the dimming values are adjusted in consideration of not only the average brightness and the maximum brightness of each block, but the high-frequency component of an image. Accordingly, the brightness of the light source 252 of the tenth block when the image (b) is outputted may be higher than the brightness of the light source 252 of the tenth block when the image (a) is outputted.

As described above, when the image display device 100 performs improved local dimming, the high-frequency component of a block is considered, so the contrast when an image is outputted is improved more than the contrast when local dimming is performed.

According to an embodiment of the present invention, since the backlight unit is divided and driven in a plurality of blocks, power consumption is reduced and at least some of the dimming values of the blocks are corrected, so the contrast is improved and the ability to express an image can be improved.

Further, since the dimming values of the blocks are corrected on the basis of the image according to the input image data and the image according to image data calculated and then corrected by the local dimming value calculator, it is possible to correct only specific areas with severe image distortion, and in this case, it is possible to minimize an increase in power consumption due to correction.

Further, since the dimming value of a block having a large color difference from the surrounding is corrected to be larger than the dimming value of a block having a small color difference from the surrounding even though the average brightness and the maximum brightness of a specific block are the same, it is possible to minimize power consumption at an area with a gentle image and to improve the ability to express a detailed area of an image.

Further, when a block that needs dimming value correction of a plurality of blocks is acquired through the structural difference of an image such as an SSIM, it is possible to more accurately acquire an image with image distortion more than when a block that needs correction is acquired through a luminance level etc.

Further, by extracting a high-frequency component, it is possible to more easily acquire a block that needs correction when a block that needs dimming value correction of a plurality of blocks is acquired.

The above description is merely illustrative of the technical idea of the present invention, and various modifications and changes may be made thereto by those skilled in the art without departing from the essential characteristics of the present invention.

Therefore, the embodiments of the present invention are not intended to limit the technical spirit of the present invention but to illustrate the technical idea of the present invention, and the technical spirit of the present invention is not limited by these embodiments.

The scope of protection of the present invention should be interpreted by the appending claims, and all technical ideas within the scope of equivalents should be construed as falling within the scope of the present invention.

What is claimed is:

1. A display device comprising:
a liquid crystal display panel;
a backlight unit configured to provide variable light to a plurality of blocks of the liquid crystal display panel; and
a controller configured to:
calculate a dimming value of each of the plurality of blocks based on input image data;
correct one or more of the calculated dimming values; and
output corrected image data for displaying a corrected image,
wherein the corrected image is displayed by varying light provided by the backlight unit to one or more of the plurality of blocks based on the corrected calculated dimming values,
wherein the controller is further configured to determine each of the corrected calculated dimming values based on an average brightness, a maximum brightness, a brightness of surrounding blocks, and a high-frequency component of each of the plurality of blocks, and
wherein the high-frequency component of each of the plurality of blocks is determined based on a number of boundary lines between one or more white areas and one or more black areas of a corresponding block.

2. The display device of claim 1, wherein the controller is further configured to correct the one or more of the calculated dimming values based on a first image according to the input image data and a second image according to the input image data corrected using the calculated dimming values.

3. The display device of claim 2, wherein a correction of the one or more of the calculated dimming values comprises setting a dimming value to be higher than a preset maximum dimming value.

4. The display device of claim 2, wherein when average brightness and maximum brightness of a first block and a second block for displaying the input image data are the same and the second block has more high-frequency components than the first block, the calculated dimming value of the first block and the calculated dimming value of the second block are the same.

5. The display device of claim 4, wherein the controller is further configured to correct the calculated dimming value of the second block to be larger than the calculated dimming value of the first block.

6. The display device of claim 1, wherein the controller is further configured to correct the input image data based on the corrected calculated dimming values for outputting the corrected image data.

7. The display device of claim 1, wherein the controller is further configured to identify a data loss block for displaying the input image data based on a difference between a first image according to the input image data and a second image according to the input image data corrected using the calculated dimming values.

8. The display device of claim 7, wherein the difference between the first image and the second image is determined based on at least one of a Structural Similarity Index (SSIM), a Peak Signal-to-Noise Ratio (PSNR), or a Mean Square Error (MSE) of the first image and the second image.

9. The display device of claim 8, wherein when the difference is determined based on SSIM of the first image and the second image, a block having an SSIM that is less than a predetermined reference value is identified as the data loss block.

10. The display device of claim 1, wherein the controller is further configured to extract a high-frequency component of the input image data, wherein a correction of the one or more of the calculated dimming values is based on the extracted high-frequency component.

11. A display device comprising:
a liquid crystal display panel;
a backlight unit configured to provide variable light to a plurality of blocks of the liquid crystal display panel; and
a controller comprising:
a local dimming value calculator configured to calculate a dimming value of each of the plurality of blocks based on input image data;
a pixel corrector configured to:
 correct one or more of the calculated dimming values; and
 output corrected image data for displaying a corrected image,
wherein the corrected image is displayed by varying light provided by the backlight unit to one or more of the plurality of blocks based on the corrected calculated dimming values,
wherein the pixel corrector is further configured to determine each of the corrected calculated dimming values based on an average brightness, a maximum brightness, a brightness of surrounding blocks, and a high-frequency component of each of the plurality of blocks,
wherein the high-frequency component of each of the plurality of blocks is determined based on a number of boundary lines between one or more white areas and one or more black areas of a corresponding block.

12. The display device of claim 11, wherein the controller further comprises a correction dimming value calculator configured to correct the one or more of the calculated dimming values based on a first image according to the input image data and a second image according to the input image data corrected using the calculated dimming values.

13. The display device of claim 12, wherein a correction of the one or more of the calculated dimming values comprises setting a dimming value to be higher than a preset maximum dimming value.

14. The display device of claim 12, wherein when average brightness and maximum brightness of a first block and a second block for displaying the input image data are the same and the second block has more high-frequency components than the first block, the calculated dimming value of the first block and the calculated dimming value of the second block are the same.

15. The display device of claim 14, wherein the correction dimming value calculator is further configured to correct the calculated dimming value of the second block to be larger than the calculated dimming value of the first block.

16. The display device of claim 11, wherein the controller further comprises a pixel corrector configured to correct the input image data based on the corrected calculated dimming values for outputting the corrected image data.

17. The display device of claim 11, wherein the controller further comprises a correction block acquirer configured to identify a data loss block for displaying the input image data based on a difference between a first image according to the input image data and a second image according to the input image data corrected using the calculated dimming values.

18. The display device of claim 17, wherein the difference between the first image and the second image is determined based on at least one of a Structural Similarity Index (SSIM), a Peak Signal-to-Noise Ratio (PSNR), or a Mean Square Error (MSE) of the first image and the second image.

19. The display device of claim 18, wherein when the difference is determined based on SSIM of the first image and the second image, a block having an SSIM that is less than a predetermined reference value is identified as the data loss block.

20. The display device of claim 11, wherein the controller further comprises an image analyzer configured to extract a high-frequency component of the input image data, wherein a correction of the one or more of the calculated dimming values is based on the extracted high-frequency component.

* * * * *